United States Patent
Saito

(10) Patent No.: US 8,234,306 B2
(45) Date of Patent: Jul. 31, 2012

(54) INFORMATION PROCESS APPARATUS, INFORMATION PROCESS METHOD, AND PROGRAM

(75) Inventor: Mari Saito, Kanagawa (JP)

(73) Assignee: Sony Corporation, Tokyo (JP)

( * ) Notice: Subject to any disclaimer, the term of this patent is extended or adjusted under 35 U.S.C. 154(b) by 160 days.

(21) Appl. No.: 12/780,447

(22) Filed: May 14, 2010

(65) Prior Publication Data
US 2010/0312767 A1  Dec. 9, 2010

(30) Foreign Application Priority Data
Jun. 9, 2009  (JP) ................ P2009-138516

(51) Int. Cl.
*G06F 17/00* (2006.01)
(52) U.S. Cl. ......... 707/791; 707/802; 707/822; 707/828
(58) Field of Classification Search ........... 707/600–831
See application file for complete search history.

(56) References Cited

U.S. PATENT DOCUMENTS

| | | | |
|---|---|---|---|
| 5,428,778 A | 6/1995 | Brookes | |
| 6,029,195 A | 2/2000 | Herz | |
| 2008/0249764 A1* | 10/2008 | Huang et al. | 704/9 |
| 2009/0144272 A1 | 6/2009 | Adarsh et al. | |

FOREIGN PATENT DOCUMENTS

| | | |
|---|---|---|
| JP | 2002-359702 | 12/2002 |
| JP | 2007-328675 | 12/2007 |

OTHER PUBLICATIONS

European search report dated Feb. 7, 2011, from the European Patent Office in corresponding European Application No. EP 10250944.0.
Jinhyung Cho, et al. "Q-Rater: A Collaborative Reputation System Based on Source Credibility Theory", Expert Systems with Applications, vol. 36, pp. 3751-3760, (2009).
Jing Qiu, et al., "Making Recommendations Based on Profitability Analysis in a Hybrid System", Proceedings of the 2003 International Conference on Cyberworlds, CW'03, pp. 352-357, (2003).

* cited by examiner

*Primary Examiner* — Isaac M Woo
(74) *Attorney, Agent, or Firm* — Finnegan, Henderson, Farabow, Garrett & Dunner, L.L.P.

(57) ABSTRACT

Provided is an information process apparatus including: an extraction unit which is configured to extract words in a predetermined word class from comments which predetermined users write about a predetermined item; a grouping unit which is configured to group the predetermined users by performing a multivariate analysis using the words extracted by the extraction unit; a storage unit which is configured to store the groups, the predetermined item, and the words in association with each other; a determination unit which is configured to determine which group a user who is to write a comment belongs to when the user is to write the comment about the predetermined item; and a reading unit which is configured to read from the storage unit words which are associated with the group determined by the determination unit and the predetermined item which the comment is to be written about.

8 Claims, 28 Drawing Sheets

FIG. 10

|  | WORD 01 | WORD 02 | WORD 03 | ... | WORD M |
|---|---|---|---|---|---|
| USER 01 | ○ |  | ○ |  |  |
| USER 02 | ○ | ○ |  |  |  |
| USER 03 |  | ○ | ○ |  |  |
| USER 04 |  | ○ | ○ |  |  |
| USER 05 | ○ | ○ |  |  |  |
| USER 06 | ○ |  | ○ |  |  |
| ⋮ |  |  |  |  |  |
| USER N | ○ | ○ | ○ |  |  |

|  | FIRST PRINCIPAL COMPONENT | SECOND PRINCIPAL COMPONENT | THIRD PRINCIPAL COMPONENT | ... |
|---|---|---|---|---|
| USER 01 | 1.25 | 0.98 | 2.87 | |
| USER 02 | 1.44 | 2.54 | 1.21 | |
| USER 03 | 0.22 | 2.31 | 2.81 | |
| USER 04 | 0.24 | 2.11 | 2.68 | |
| USER 05 | 1.46 | 2.64 | 0.94 | |
| USER 06 | 1.43 | 0.87 | 1.98 | |
| ⋮ | | | | |
| USER N | 0.50 | 2.13 | 2.64 | |

| USER ID | GROUP ID |
|---------|----------|
| 0001    | A-001    |
| 0002    | B-032    |
| 0003    | A-002    |
| ⋮       | ⋮        |

| GROUP ID | ITEM ID | IMPRESSION WORD (GROUP) |
|---|---|---|
| A-001 | 0001 | TRIVIAL, TEDIUM, ... |
| A-001 | 0002 | SUPRISE, FRESHNESS, ... |
| A-001 | 0003 | LUX, FLAMBOYANCE, ... |
| ⋮ | ⋮ | ⋮ |
| A-002 | 0001 | LEISURELY, PEACE, ... |
| A-002 | 0002 | VIOLENCE, DISLIKE, ... |
| ⋮ | ⋮ | ⋮ |

|  | MUSIC PIECE 01 | MUSIC PIECE 02 | MUSIC PIECE 03 | ... | MUSIC PIECE M |
|---|---|---|---|---|---|
| USER 01 | ○ |  | ○ |  |  |
| USER 02 |  | ○ |  |  |  |
| USER 03 |  |  | ○ |  | ○ |
| ⋮ |  |  |  |  |  |
| USER N |  |  | ○ |  |  |

501

INFORMATION PROCESS APPARATUS, INFORMATION PROCESS METHOD, AND PROGRAM

BACKGROUND OF THE INVENTION

1. Field of the Invention

The present invention relates to an information process apparatus, an information process method, and a program, and more particularly, to an information process apparatus, an information process method, and a program, where, in the case where a user inputs a comment, words as input candidates are recommended to assist in inputting.

2. Description of the Related Art

Recently, as the Internet has been rapidly developed, various services have been provided on the Internet. For example, there is a service of selling a predetermined product on the Internet. Among the sites providing such a service, there are sites where comments which are written by persons who bought products, comments which are written by persons who viewed contents, or the like are allowed to be published.

In addition, there is a service of publishing a diary written as a blog on the Internet. In such a site, there may also be written comments such as a feeling about a predetermined item, which are written by users opening the blogs, comments which are written by persons who view the published diary, or the like.

For example, Japanese Unexamined Patent Application Publication No. 2007-328675 discloses that metadata of the contents are allocated from the user's comments. The allocated metadata are used as data representing features of the contents. For example, the allocated metadata may be referred to when a recommendation process is performed.

In addition, on the Internet, there is also provided a service of searching for a desired service among various services provided. For example, in the case where a user is searching for his/her desired contents, the user inputs keywords for searching for the desired contents in a search field. Japanese Unexamined Patent Application Publication No. 2002-359702 discloses a technology in which appropriate search words are recommended in the search field by taking into consideration the situation at this search time.

SUMMARY OF THE INVENTION

In the case where the metadata of the contents are allocated from the user's comments, the metadata appropriate to the user's feeling may be allocated. However, the user may use only the same expression, so that variations of the expression may be limited.

In addition, in the case where appropriate search words are recommended by determining the situation at this search time, general words may be recommended, so that different words according to the user's preference or feeling may not be easily recommended. In addition, it is difficult to recommend appropriate words to all users.

The invention is to recommend information appropriate to a user's preference or feeling so that the information may be allowed to have variations.

According to an embodiment of the present invention, there is provided an information process apparatus including: an extraction unit which is configured to extract words in a predetermined word class from comments which predetermined users write about a predetermined item; a grouping unit which is configured to group the predetermined users by performing a multivariate analysis using the words extracted by the extraction unit; a storage unit which is configured to store the groups, the predetermined item, and the words in association with each other; a determination unit which is configured to determine which group a user who is to write a comment belongs to when the user is to write the comment about the predetermined item; and a reading unit which is configured to read from the storage unit words which are associated with the group determined by the determination unit and the predetermined item which the comment is to be written about.

The grouping unit may generate a matrix of the users and the words and performs a dimensional compression using the matrix, perform mapping of a result of the dimensional compression, and classify the users into a plurality of the groups by using a result of the mapping.

The groups may be hierarchized, and the reading unit may read the words sequentially from the lowest layer group, and if the number of the words associated with the lower layer group is a predetermined number or less, the reading may be performed by reading the words associated with the upper layer group.

A plurality of the items may be associated with the same word.

The information process apparatus may further include a crawling unit which is configured to perform crawling in order to add a new word to the storage unit.

Information of a user's preference may be acquired, and the grouping unit may perform the grouping of the users by performing the multivariate analysis using the information of the preference.

According to another embodiment of the present invention, there is provided an information process method of an information process apparatus having an extraction unit, a grouping unit, a storage unit, a determination unit, and a reading unit, including: the steps of: in the extraction unit, extracting words in a predetermined word class from comments which predetermined users write about a predetermined item; in the grouping unit, grouping the predetermined users by performing a multivariate analysis using the words extracted by the extraction unit; in the storage unit, storing the groups, the predetermined item, and the words in association with each other; in the determination unit, determining which group a user who is to write a comment belongs to when the user is to write the comment about the predetermined item; and in the reading unit, reading from the storage unit words which are associated with the group determined by the determination unit and the predetermined item which the comment is to be written about.

According to still another embodiment of the present invention, there is provided a program allowing a computer to execute processes on an information process apparatus having an extraction unit, a grouping unit, a storage unit, a determination unit, and a reading unit, the processes including: the steps of: in the extraction unit, extracting words in a predetermined word class from comments which predetermined users write about a predetermined item; in the grouping unit, grouping the predetermined users by performing a multivariate analysis using the words extracted by the extraction unit; in the storage unit, storing the groups, the predetermined item, and the words in association with each other; in the determination unit, determining which group a user who is to write a comment belongs to when the user is to write the comment about the predetermined item; and in the reading unit, reading from the storage unit words which are associated with the group determined by the determination unit and the predetermined item which the comment is to be written about.

In the information process apparatus and method, and the program according to an embodiment of the invention, words in a predetermined word class are extracted from comments which predetermined users write about a predetermined item, and the users are classified into a plurality of groups by performing a multivariate analysis using the extracted words. In addition, when a comment is to be written about a predetermined item, the words which are associated with the group to which the user who is to write the comment belongs and the item are read from a storage unit where groups, predetermined items, and words are managed in association with each other.

According to an embodiment of the invention, it may be to recommend information appropriate to a user's preference or feeling to the user. In addition, the recommended information may be allowed to have variations.

BRIEF DESCRIPTION OF THE DRAWINGS

FIG. 10 is a diagram illustrating data of a matrix.
FIG. 11 is a diagram illustrating data of a matrix.
FIG. 14 is a diagram illustrating data of user database.
FIG. 18 is a diagram illustrating data of impression word database.
FIG. 27 is a diagram illustrating data of a matrix.

DESCRIPTION OF THE PREFERRED EMBODIMENTS

Hereinafter, exemplary embodiments of the invention will be described with reference to the drawings.

As described later, in the invention, for example, when a user writes comments about a predetermined item, information, for example, words that the user seams to write are recommended to the user. First, various scenes for word (information) recommendation are described.

Example of Information Recommendation

Figure 1:
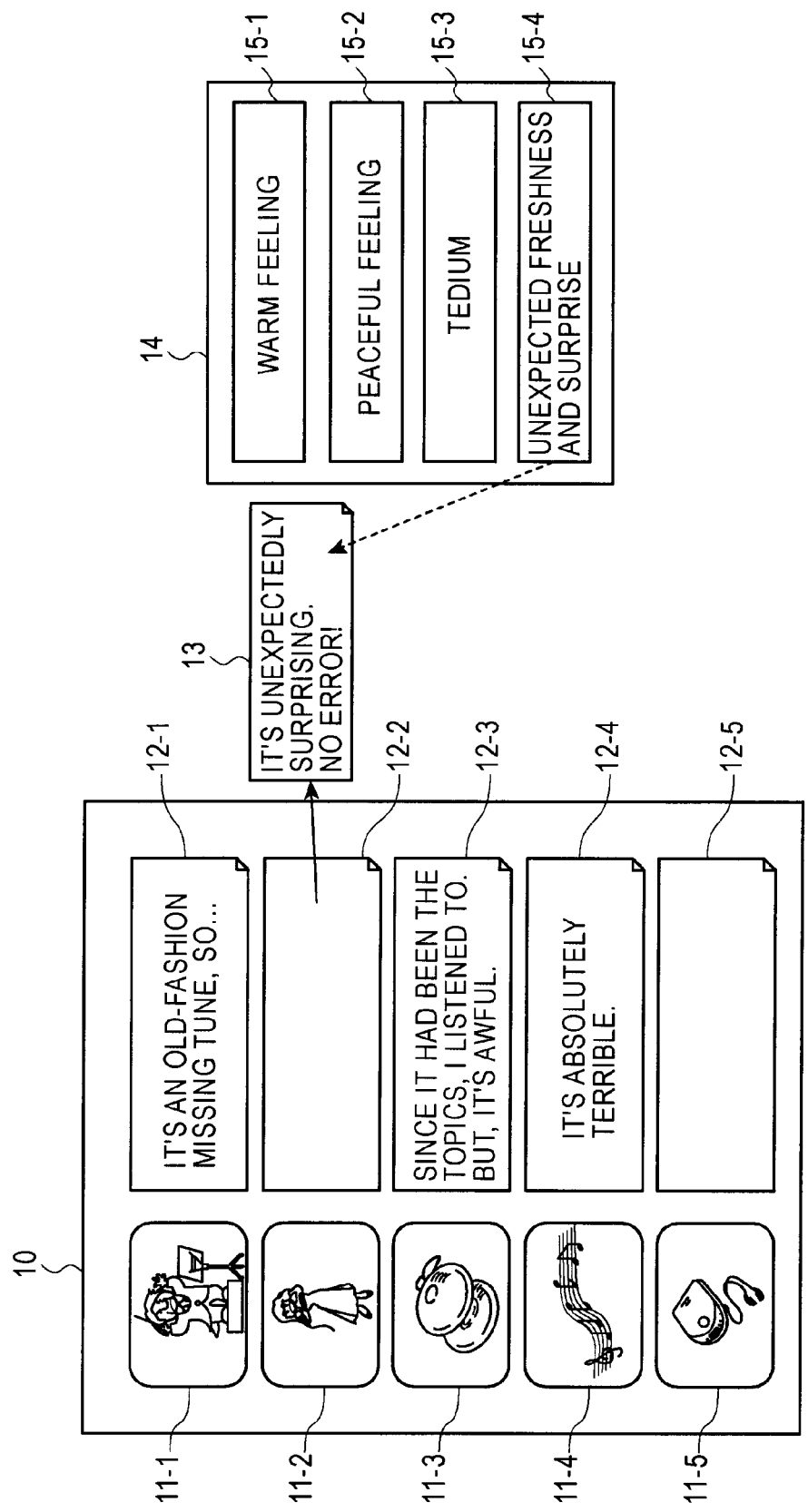
FIG. 1 is a diagram illustrating an impression word.

FIG. 1 illustrates an example of a window 10 of a site of, for example, delivering (selling) music (music pieces). In addition, the figure also illustrates an example of the window 10 of a blog page where a predetermined user opens comments about the music to which the user listened. In the left side of the window 10, images 11-1 to 11-5 are displayed. The images 11-1 to 11-5 are the images representing music pieces in the form of thumbnail images of, for example, covers. In the right side of the images 11-1 to 11-5, comment fields 12-1 to 12-5 are provided.

For example, in the case where the window 10 is a window of a total product selling site, or an individual shopping site of handling music as a product, the comment of a person who listened to the music piece indicated by the image 11-1 is written in the comment field 12-1.

In addition, for example, in the case where the window 10 shown in FIG. 1 is a window of a Blog, an SNS (social network service), personal home page (HP), or the like, the image associated with the music piece listened to by the user who opens the Blog or the like is displayed in the image 11-1, and the comment about the music piece is written in the comment field 12-1.

When the user is writing the comment about the music piece associated with the image 11-2 in the comment field 12-2, predetermined information is recommended to the user. For example, words used for writing the comment 13 are recommended to the user. The recommended word is referred to as an impression word. The comment 13 is written as follows. An impression word group 14 listing impression words 15-1 to 15-4 is recommended to the user, and the user selects the impression word 15-4 from the impression word group 14, so the comment is written.

The impression words 15 appropriate to the user (referred to as a user A) who writes the comment 13 are recommended as the impression word group 14. The recommended impression words 15 are impression words (words and expressions) that persons of a group, to which the user A belongs, frequently use for a music piece (referred to as a music piece A) corresponding to the image 11-2. The impression words 15 that the user A is to use as a comment about the music piece A are not recommended, but the impression words 15 that the persons of the group, to which the user A belongs, are to use as a comment about the music piece A are recommended.

If the impression word is recommended about a comment which is estimated to be written about the music piece A by the user A by reflecting the preference or feeling of only the user A, the impression word may be appropriated to the user A, but only the impression word that the user A frequently uses may be recommended. However, if the impression word that the persons of the group to which the user A belongs use for the comment about the music piece A is recommended as described above, the preference or feeling of the user A can be reflected, and the impression words that the user A does not frequently use may be recommended. In other words, an impression word that the user A has not thought of can be recommended, and an impression word that reflects the preference or feeling of the user A can be recommended.

Due to the recommendation of the impression word, various comments of the user A are available.

Referring to FIG. 1 again, when the comment 13 is to be written, an impression word 15-1 "warm feeling", an impression word 15-2 "peaceful feeling", an impression word 15-3 "tedium", and an impression word 15-4 "unexpected surprise" are recommended to the user A. The recommended impression words 15-1 to 15-4 are all the words that a person of the group to which the user A belongs has ever used for a comment about the music pieces A. When the impression word group 14 is recommended, the user A may select the impression word 15-4 "unexpected surprise" that is determined to be appropriate to his/her own impression, so that the comment 13 is generated (the comment is written in the comment field 12-2).

In order to implement the information recommendation, in the embodiment, as described later, a learning process of generating a group for specifying users, analyzing information indicating a preference or a feeling about a predetermined item (a music piece in the above example) with respect to the group, and collecting candidates for the impression words is performed. In addition, a recommendation process of determining which group a predetermined user belongs to and recommending information based on a result of the determination is performed. The learning process and the recommendation process are described later in detail. Next, the description is continuously made with another example of an image.

Figure 2:
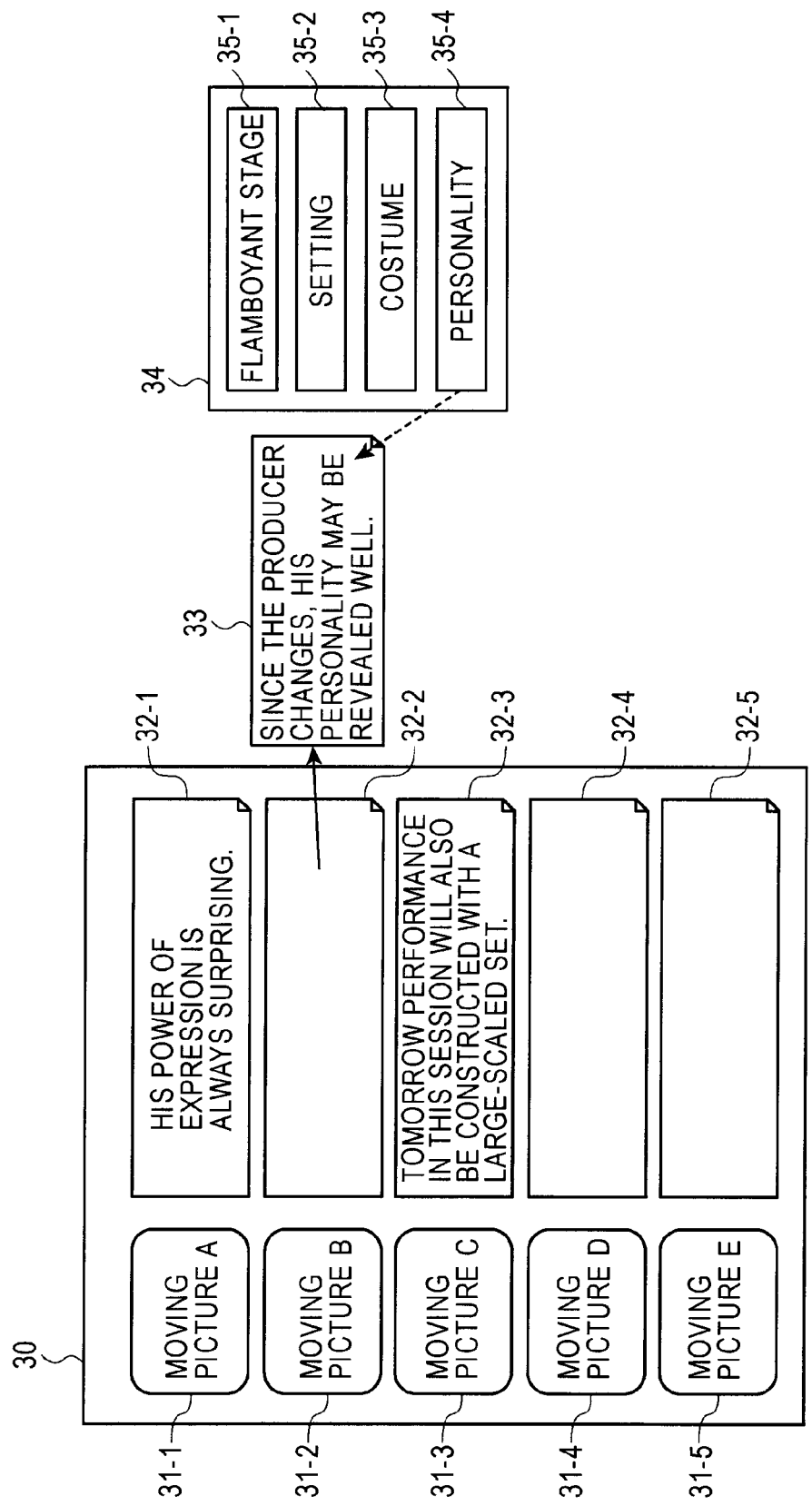
FIG. 2 is a diagram illustrating an impression word.

Next, another example of the window is shown in FIG. 2. FIG. 2 is an example of a window 30 of a site that delivers, for example, moving pictures. In addition, the figure is an example of a window 30 of a page of a blog or the like, where comments are written about moving pictures that a predetermined user has viewed. In the left side of the window 30, images 31-1 to 31-5 are displayed. The images 31-3 to 31-5 are images representing moving pictures and, for example, images each of which represents one scene of each moving picture.

When a comment about the music piece corresponding to the image 31-2 is to be written in the comment field 32-2, predetermined information is recommended to the user. For example, impression words used for writing a comment 33 are recommended to the user side. The comment 33 is the comment that is generated when the user selects the impression word 35-4 from the impression word group 34 listing the impression words 35-1 to 35-4 which are recommended to the user side.

The impression words appropriate to a user (referred to as a user B) who is to write the comment 33 are recommended as the impression word group 34. The recommended impression words are impression words (words and expressions) that persons of a group, to which the user B belongs, frequently use for a moving picture (referred to as a moving picture B) corresponding to the image 31-2. The words that are to be used as the comment about the moving picture B by the persons of the group to which the user B belongs are recommended.

Referring to FIG. 2, when the comment 33 is to be written, an impression word 35-1 "flamboyant stage", an impression word 35-2 "setting", an impression word 35-3 "costume", and an impression word 35-4 "personality" are recommended to the user B. The recommended impression words 35-1 to 35-4 are the words that a person of the group to which the user B belongs has ever used for a comment about the moving picture B. When the impression word group 34 is recommended, the user B may select the impression word 35-4 "personality" that is determined to be appropriate to his/her own impression, so that the comment 33 is generated (the comment is written in the comment field 32-2).

Figure 3:
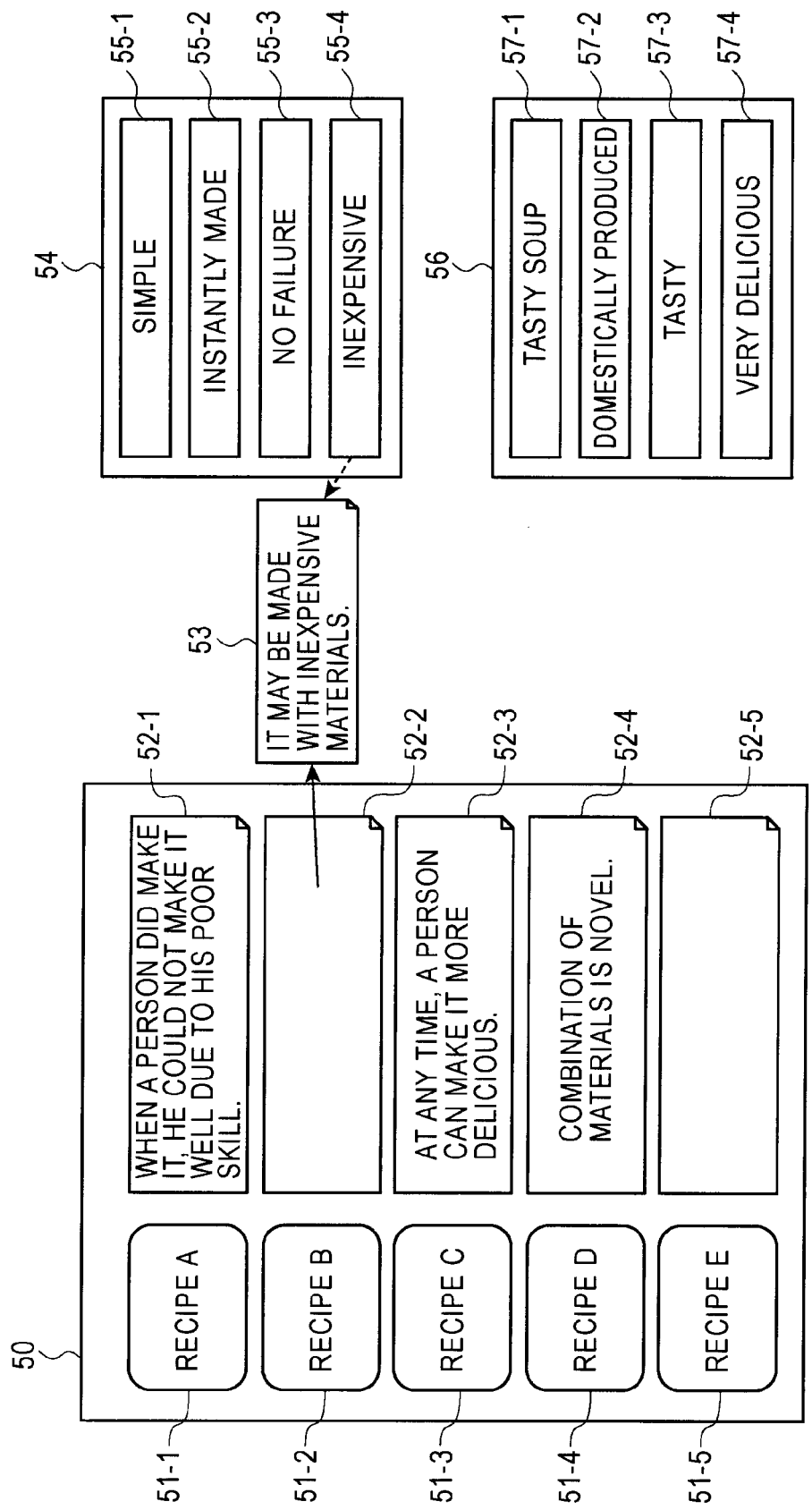
FIG. 3 is a diagram illustrating an impression word.

Next, still another example of the window is shown in FIG. 3. FIG. 3 is an example of a window of a site that delivers, for example, recipes. These recipes may be provided as information by a site which is managed by a company which handles seasonings as products. In addition, these recipes may be published in a blog or the like by a predetermined user. An example where a comment is written about the published recipes is shown in FIG. 3. In the left side of the window 50, images 51-1 to 51-5 are displayed. The images 51-1 to 51-5 are images of, for example, completed dishes.

When a comment about the recipe corresponding to the image 51-2 is to be written in the comment field 52-2, the impression word group 54 is recommended to the user. The comment 53 is the comment that is generated when the user selects the impression word 55-4 from the impression word group 54 listing the impression words 55-1 to 55-4 which are recommended to the user side.

The impression words appropriate to a user (referred to as a user C) who is to write the comment 53 are recommended as the impression word group 54. The recommended impression words are impression words (words and expressions) that persons of a group, to which the user C belongs, frequently use for a recipe (referred to as a recipe B) corresponding to the image 51-2. The impression words that are to be used as the comment about the recipe B by the persons of the group to which the user C belongs are recommended to the user C.

Referring to FIG. 3, when the comment 53 is to be written, an impression word 55-1 "simple", an impression word 55-2 "instantly made", an impression word 55-3 "no failure", and an impression word 55-4 "inexpensive" are recommended to the user C. The recommended impression words 55-1 to 55-4 are the words that a person of the group to which the user C belongs has ever used for a comment about the recipe B. When the impression word group 54 is recommended, the user C may select the impression word 55-4 "inexpensive" that is determined to be appropriate to his/her own impression, so that the comment 53 is generated (the comment is written in the comment field 52-2).

Although the impression word group 54 is recommended to the user C, the impression word group 56 is recommended to the user D who belongs to a group which is different from the group to which the user C belongs. Although not shown in FIG. 1 or FIG. 2, in the example shown in FIG. 1 or the example shown in FIG. 2, the impression word group are also prepared so that the impression word group is to be recommended to users other than the users A and B who belong to a group which is different from the groups to which the users A and B belong.

The impression word group 56 recommended to the user D includes an impression word 57-1 "tasty soup", an impression word 57-2 "domestically produced", an impression word 57-3 "tasty", and an impression word 57-4 "very delicious". The recommended impression words 57-1 to 55-4 are all the words that a person of the group to which the user D belongs has ever used for a comment about the recipe B.

Herein, the comparison between impression word group 54 and the impression word group 56 is described. The impression word group 54 listing "simple", "instantly made", "no failure", and "inexpensive" is the impression word group that may be recommended to persons who are estimated to be a beginner in cooking. The impression word group 56 listing "tasty soup", "domestically produced", "tasty", and "very delicious" are the impression word group that may be recommended to persons who are estimated to have attainments in cooking.

Therefore, the user C is determined to belong to the group of beginners in cooking. The impression words that are extracted from the comments which the beginners in cooking have written about the recipe B are recommended as the impression word group 54 to the user C. In addition, the user D is determined to belong to the group of the persons having attainments in cooking. The impression words that are extracted from the comments which the persons having attainments in cooking have written about the recipe B are recommended as the impression word group 56 to the user D.

In this manner, the grouping is performed as described below, and the processes are performed by using a result of the grouping. Therefore, similarly, the impression word group that is recommended when the comment about, for example, the recipe B is to be written may be differently set according to the user. In addition, since the impression word group is set according to the group to which the user's preference or feeling is reflected, the impression word group which reflects the user's preference or feeling may be implemented.

In addition, in the above description and the below description, the impression word is recommended to the user. However, information such as emoticons, pictograms, or English words other than the impression words may be recommended. In addition, although the same impression words are recommended, the impression words in different formats such as Gothic font or Mingcho font may be recommended. This is configured by considering that each group may have its favorite format.

In the description hereinafter, the aforementioned music pieces, moving pictures, and recipes are referred to as items. In addition, the items include music pieces, programs, and data for the programs or the like that are provided to the users and apparatuses such as home electric appliances that are to be provided to the users. The items have a meaning as an object about which the user is to write a comment as an evaluation or a feeling.

Configuration of System

Figure 4:
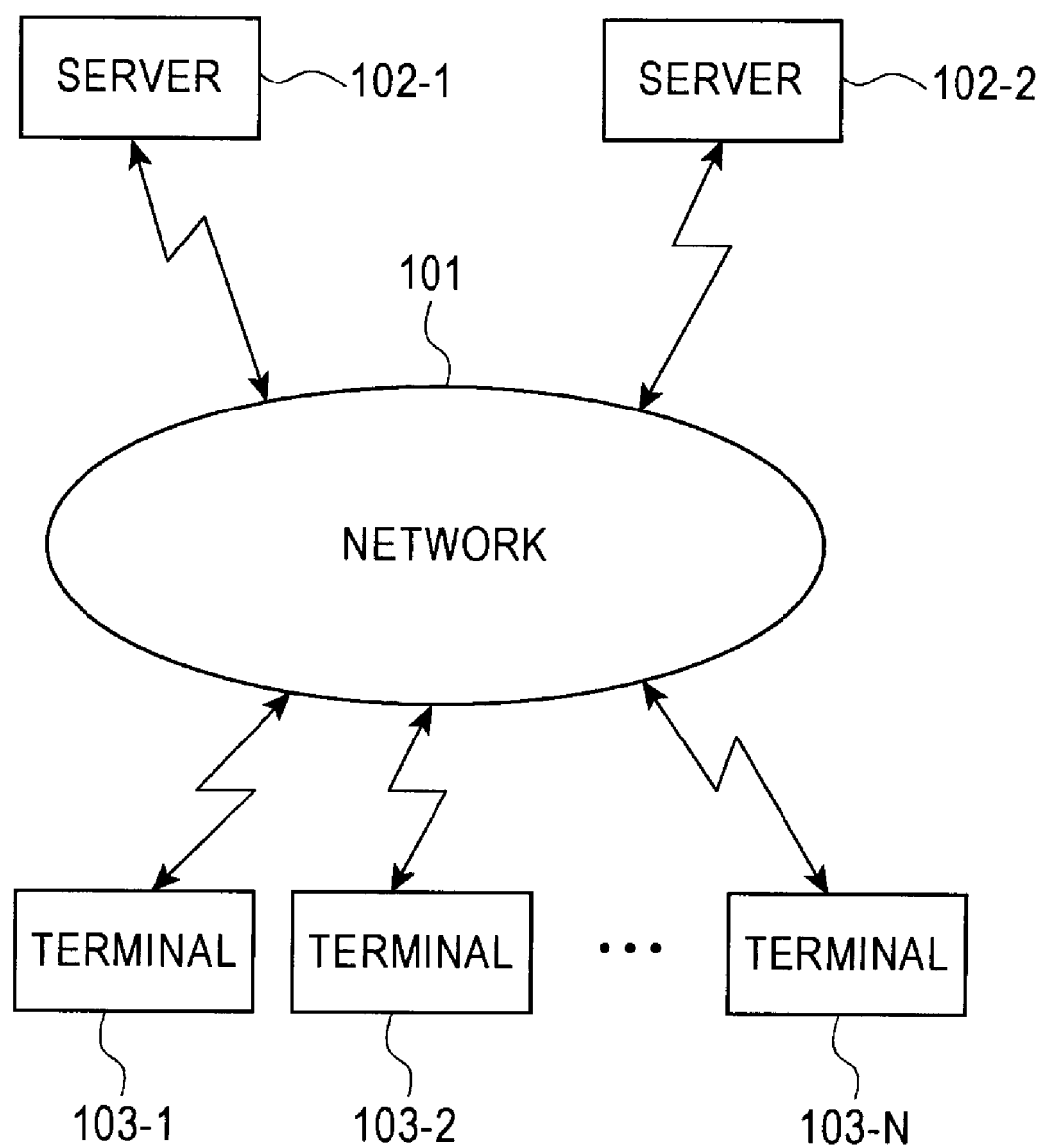
FIG. 4 is a diagram illustrating a configuration of a system.

FIG. 4 is a diagram illustrating a configuration of a system according to an embodiment of the invention. Servers 102-1 and 102-2 and terminals 103-1 to 103-N are connected to a network 101. The system shown in FIG. 4 is a system which is used to write a comment about a predetermined item and to recommend the aforementioned impression word group. The network 101 is constructed with the Internet, a LAN (local area network), or the like.

Servers 102-1 and 102-2 generate data for providing the window 10, the window 30, or the window 50 shown in FIGS. 1 to 3 and provide the data. In the description hereinafter, in the case where the servers 102-1 and the server 102-2 don't have to be distinguished from each other, the servers are simply referred to as a server 102. In addition, other components are referred in a similar manner. In addition, although only two servers 102 are described in FIG. 4, a plurality of the servers 102 may also be provided.

The server 102 recommends a predetermined impression word group to a predetermined user by using the aforementioned grouping process and grouping result. The terminals 103-1 to 103-N are user-side terminals. When a user is to write a comment about a predetermined item by using the terminal 103, an impression word (group) appropriate for the user and the item is generated by the server 102 and is supplied to the terminal 103 via the network 101.

As described with reference to FIGS. 1 to 3, when a comment is written about a predetermined item, the comment management is mainly divided into management of a product selling site which sells the items and management of a service provider which manages blogs. Herein, the description proceeds under the assumption that the server 102-1 is a server managed by a product selling company and the server 102-2 is a server managed by a service provider system.

The server 102-1 managed by the product selling company is a server of a total product selling site that sells all the items in a plurality of genres at one site, a server that manages a site where a plurality of stores are individually located, or the like. In addition, since comments may be written about predetermined items in auction, chatting, bulletin boards, or the like, servers providing these services are included as examples of the server 102-1.

The server 102-2 managed by the service provider system manages blogs, SNS, personally-opened homepages that are provided as services.

As an item as an object about which a comment is to be written in such a site (item as an object of word-of-mouth), there is music shown in FIG. 1 (CD selling or downloading), a moving picture shown in FIG. 2, or a recipe shown in FIG. 3. In addition, the moving picture includes a moving picture that is published for the purpose of sale and a moving picture that is picked up and published by an amateur. In addition, the item considered as an object of word-of-mouth includes books (selling or downloading of books as paper media), movies, TV broadcasting programs, still image, and the like.

Configurations of Severs and Terminals

Figure 5:
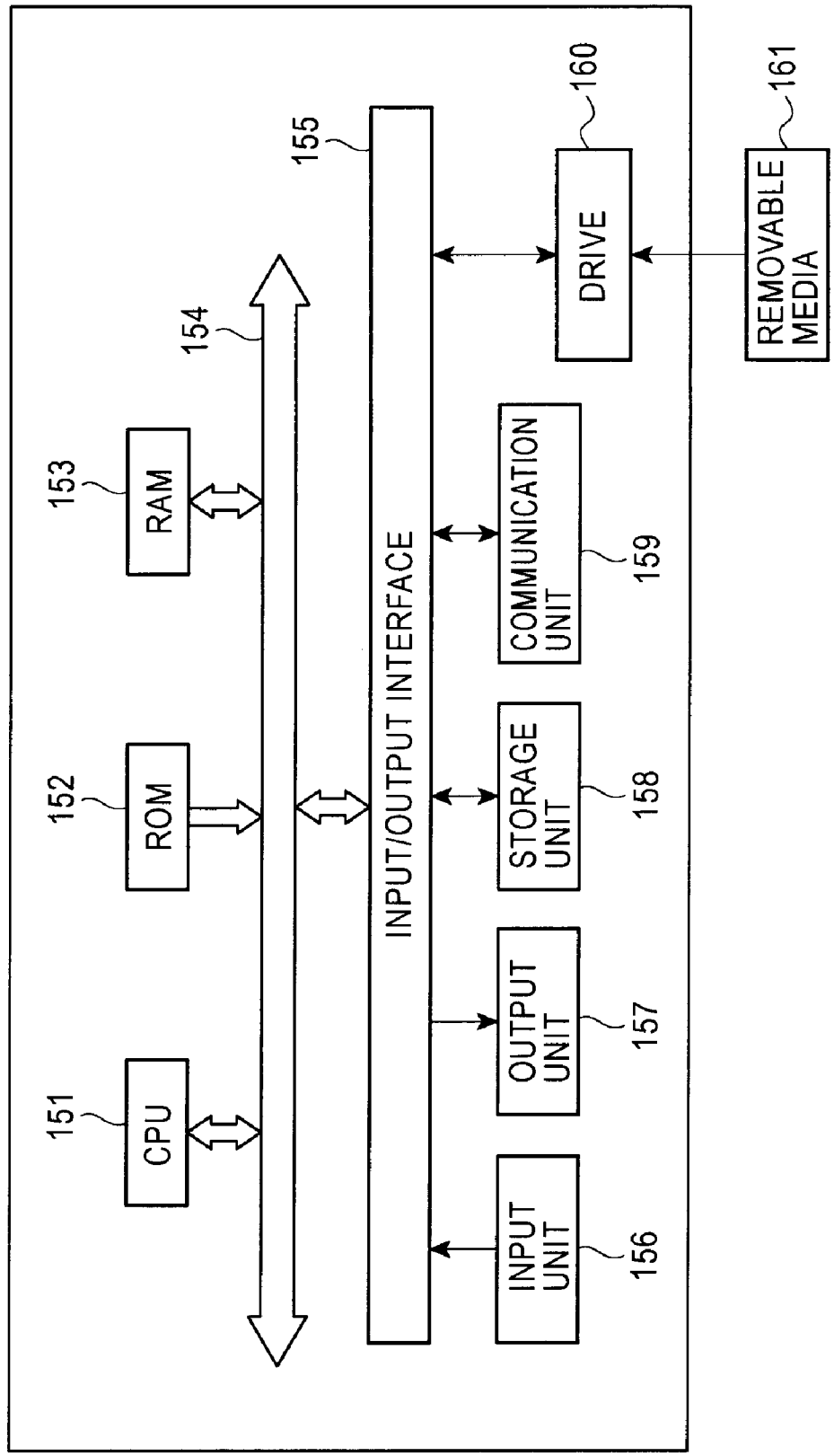
FIG. 5 is a diagram illustrating a configuration of a server according to an embodiment of the invention.

FIG. 5 is a diagram illustrating an example of a hardware configuration of a server 102. A CPU (central processing unit) 151 executes various process according a program stored in a ROM (read only memory) 152 or a storage unit 158. Programs executed by the CPU 151 and data or the like are properly stored in a RAM (random access memory) 153. The CPU 151, the ROM 152, and RAM 153 are connected to each other via a bus 154.

In addition, an input/output interface 155 is connected to the CPU 151 via the bus 154. An input unit 156 constructed with a keyboard, a mouse, a microphone, or the like and an output unit 157 such as a display, a speaker, or the like are connected to the input/output interface 155. The CPU 151 executes various processes in response to a command input from the input unit 156. Next, the CPU 151 outputs a result of the process to the output unit 157.

The storage unit 158 connected to the input/output interface 155 is constructed with, for example, a hard disk and is configured to store the program executed by the CPU 151 and various data. The communication unit 159 communicates with external apparatuses (for example, the terminals 103) via the network 101. In addition, the program may be acquired through the communication unit 159 and stored in the storage unit 158.

When a remote media 161 such as a magnetic disk, an optical disk, an optical magnetic disk, or a semiconductor memory is loaded, a drive 160 connected to the input/output interface 155 is configured to drive the remote media to acquire the program or data stored in the remote media 161. The acquired program or data are transmitted to and stored in the storage unit 158 if necessary.

The terminal 103 may basically have the same configuration as the server 102. Therefore, herein, the description thereof is omitted.

Functions of Servers and Terminals

Figure 6:
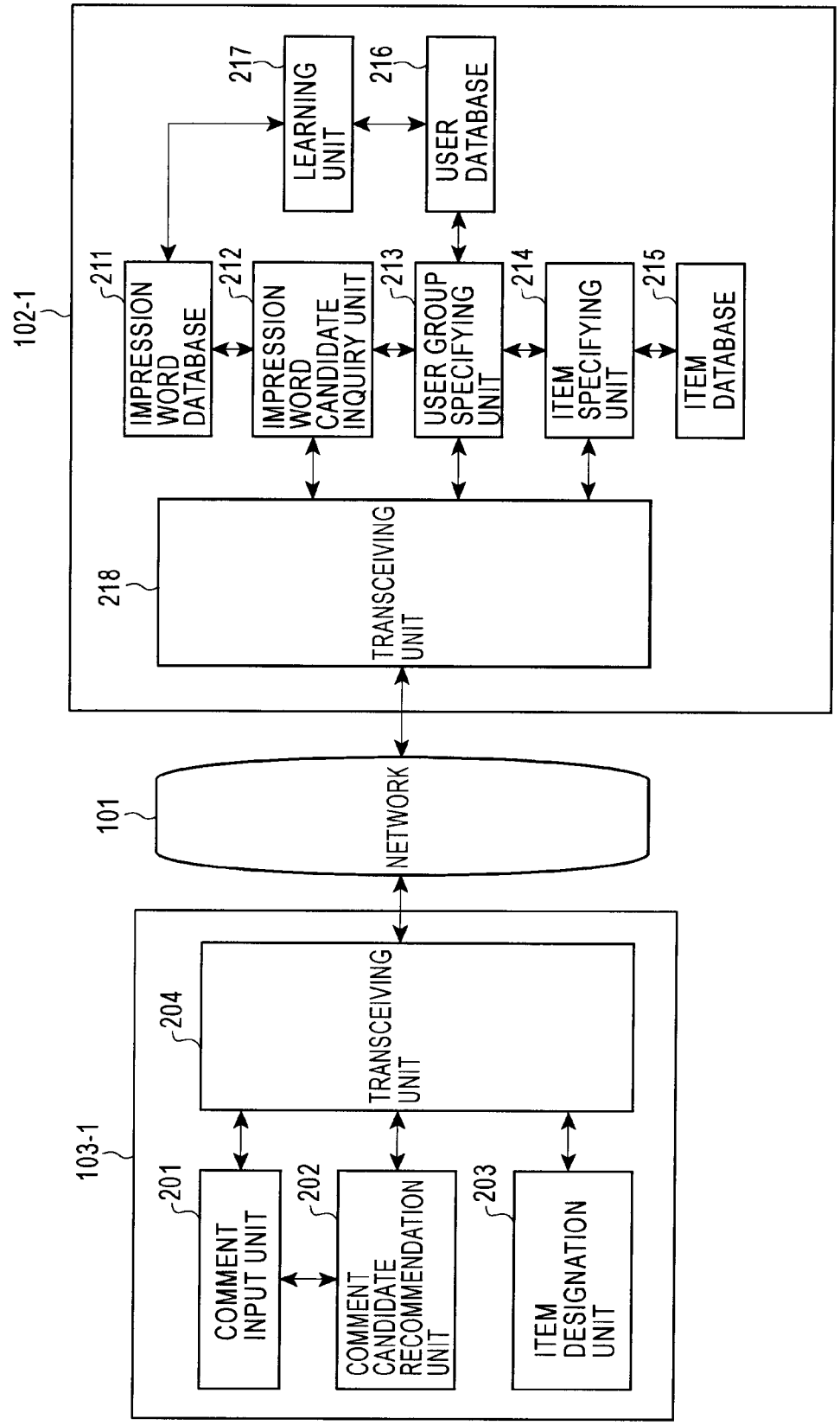
FIG. 6 is a diagram illustrating an example of a functional configuration of a server.

FIG. 6 is a diagram illustrating functions of the server 102-1 and functions of the terminal 103-1. The system shown in FIG. 6 is a system including the server 102-1 of a product selling site. The terminal 103-1 includes a comment input unit 201, a comment candidate recommendation unit 202, an item designation unit 203, and a transceiving unit 204. The comment input unit 201 has a function of receiving and processing a comment input by a user. For example, the comment input unit 201 controls the input from the keyboard constituting the input unit 156 and performs controls for displaying the input on the display constituting the output unit 157.

The comment candidate recommendation unit 202 has a function of recommending the impression word group 14, for example, shown in FIG. 1. In this case, the impression word group 14 is a list of candidate words constituting the comment. The impression word group 14 is supplied through the transceiving unit 204 from the side of the server 102-1. The comment candidate recommendation unit 202, for example, controls displaying the impression word group 14 supplied through the transceiving unit 204 on the display.

The item designation unit 203 has a function of designating an item which the comment is to be written about. For example, in this case, the item is a product which the server 102-1 sells. The transceiving unit 204 has a function of communicating data with the server 102-1 through the network 101.

The server 102-1 includes an impression word database 211, an impression word candidate inquiry unit 212, a user group specifying unit 213, an item specifying unit 214, an item database 215, a user database 216, a learning unit 217, and a transceiving unit 218.

The impression word database 211 stores impression words. For example, in the case where the window 30 or the impression word groups 54 and 56 shown in FIG. 3 are recommended, the impression words 55-1 to 55-4 listed in the impression word group 54 and the impression words 57-1 to 57-4 listed in the impression word group 56 are stored in the impression word database 211.

The impression word candidate inquiry unit 212 reads the impression words, which are recommended to the user, from the impression word database 211 and transmits the impression words through the transceiving unit 218 to the side of the terminal 103-1. The impression word candidate inquiry unit 212 determines the to-be-recommended impression word according to the group of the user specified by the user group specifying unit 213 and the item specified by the item specifying unit 214.

The user group specifying unit 213 specifies the group of the user (the user to which the impression words are to be recommended) who is to write the comment with reference to the user database 216. The data that are used to specify the group of the user as the processing object are stored in the user database 216.

The item specifying unit 214 specifies the item, which the user is to write the comment about, with reference to the item database 215. For example, IDs that are used to specify the items are stored in the item database 215. In this case, since the server 102-1 is a server of a product selling site, the data that are used to manage the selling items are stored in the item database 215.

The learning unit 227 performs the grouping process. A result of the learning in the learning unit 227 is stored in the user database 226. In addition, the learning unit 227 also performs a process of extracting the impression words from the comments and registering the impression words in the impression word database 211. The transceiving unit 218 has a function of communicating data with the terminal 103 through the network 101.

Figure 7:
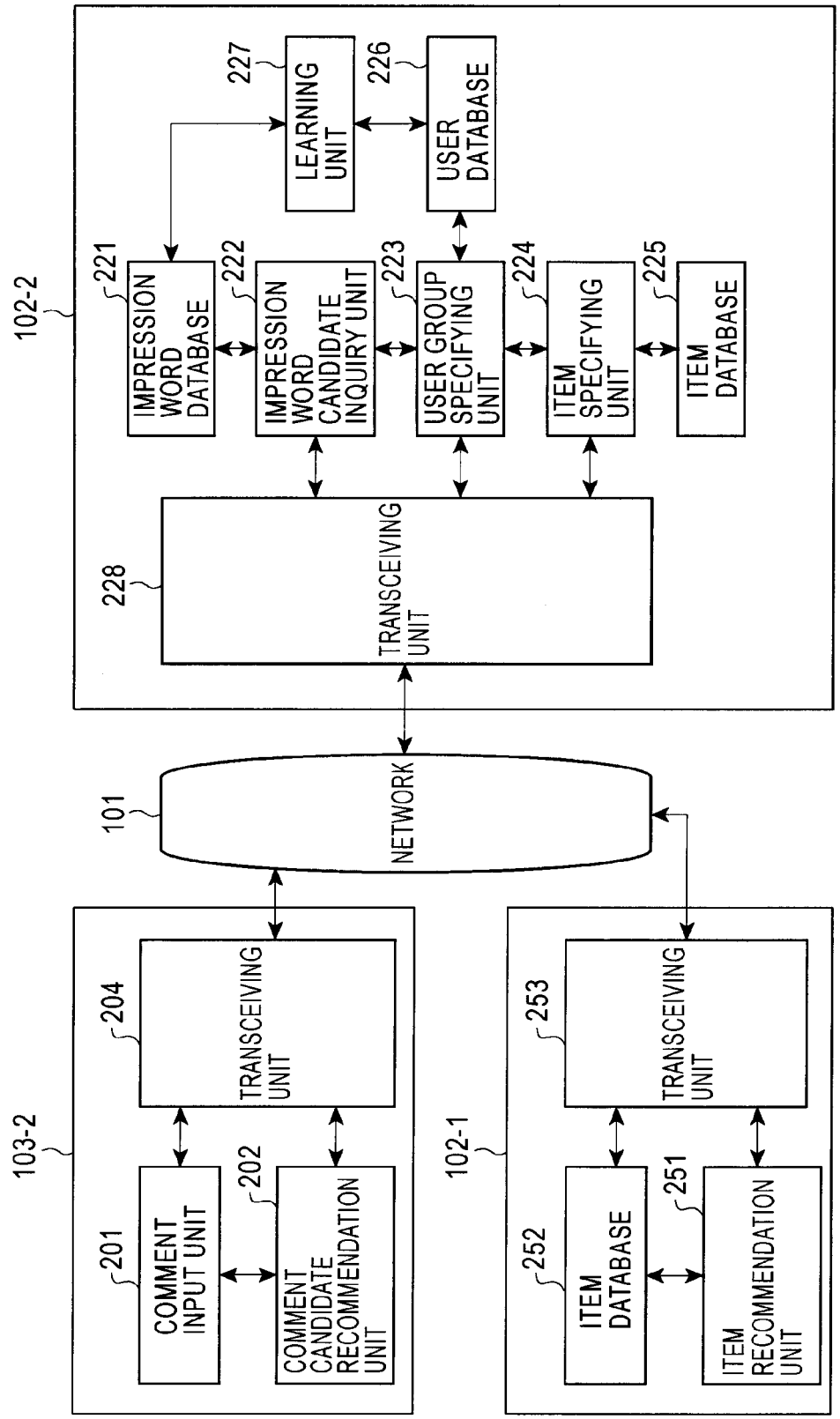
FIG. 7 is a diagram illustrating another example of a functional configuration of a server.

FIG. 7 is a diagram illustrating the functions of a server 102-2 and the functions of a terminal 103-2. The system shown in FIG. 7 is a system including a service provider server 102-2. The terminal 103-2 includes a comment input unit 201, a comment candidate recommendation unit 202, and a transceiving unit 204. The terminal 103-2 shown in FIG. 7 is different from the terminal 103-1 shown in FIG. 6, in that it is configured not to have the item designation unit 203. Since other elements are the same, the same elements are denoted by the same reference numerals, and the description thereof is omitted.

The server 102-2 has the same configuration as the server 102-1 shown in FIG. 6. In other words, the impression word database 221 to the transceiving unit 228 have the same functions as the impression word database 211 to the transceiving unit 218 of the server 102-1.

However, the item database 225 stores data for specifying the items, for example, in a blog by managing the data specifying the items with unique IDs or the like of the server 102-2. In addition, the item may be identified by using IDs similar to those in the server 102-1 of the product selling site. In this case, links to the server 102-1 are provided so as to manage the data of the item database 225.

For example, as shown in FIG. 7, the server 102-1 is configured to include an item exhibition unit 251, an item database 252, and a transceiving unit 253. The item exhibition 251 has a function of exhibiting the data stored in the item database 252 to the server 102-2. Due to the function, the ID that is to be allocated to a predetermined item in the item database 252 of the server 102-1 and the ID that is to be allocated to the predetermined item in the item database 225 of the server 102-2 may be set to be the same ID.

The functional configurations shown in FIGS. 6 and 7 are exemplary, and thus, the invention is not limited thereto.

First Grouping Process

Figure 8:
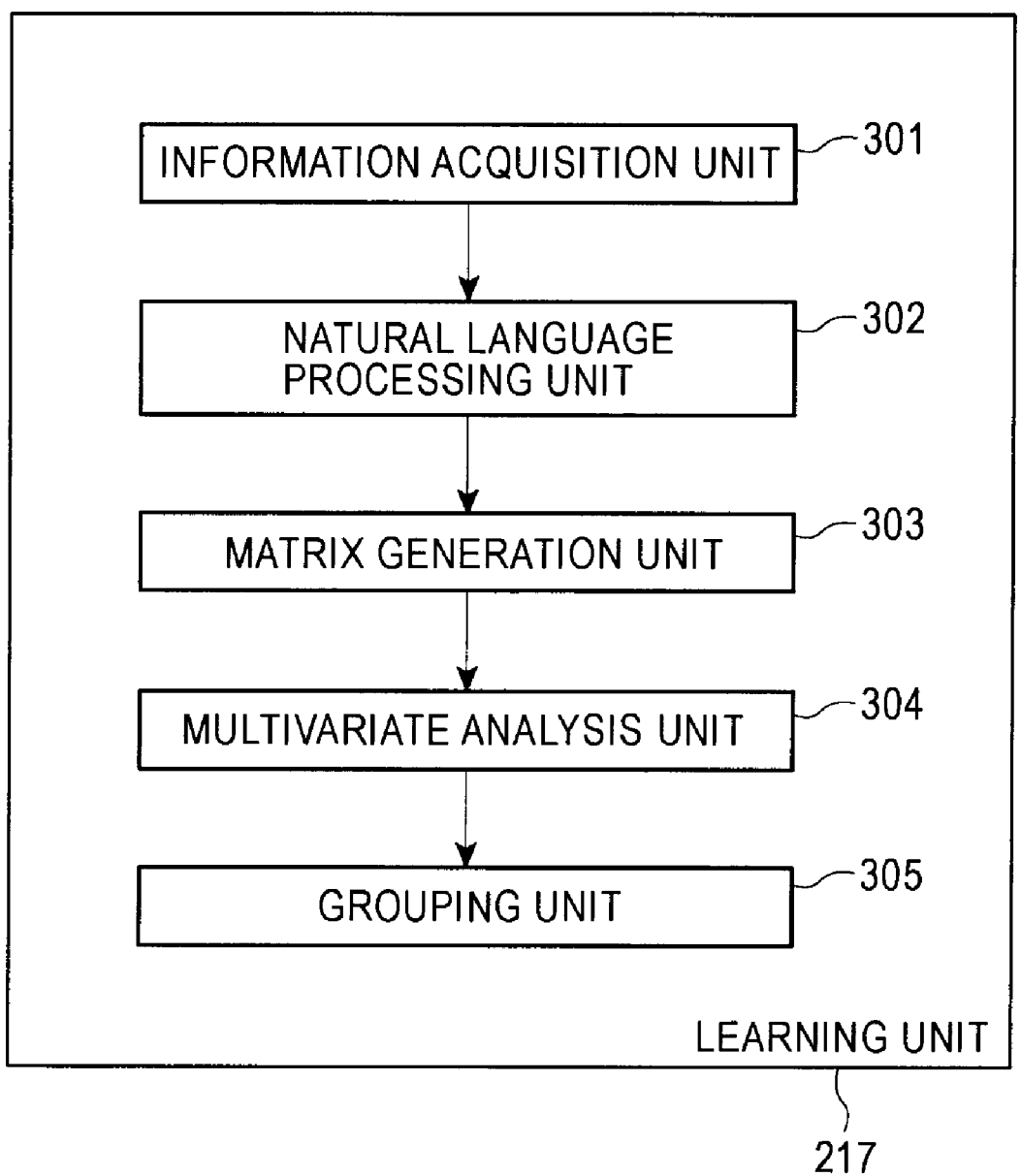
FIG. 8 is a diagram illustrating an example of a functional configuration of a learning unit.

Next, the grouping process is described. The learning unit 217 (FIG. 6) and the learning unit 227 (FIG. 7) perform individually the grouping processes. However, since the grouping processes are the same, the description hereinafter is made by exemplifying the grouping process performed by the learning unit 217. FIG. 8 is a diagram illustrating an example of an internal configuration of the learning unit 217. The learning unit 217 is configured to include an information acquisition unit 301, a natural language processing unit 302, a matrix generation unit 303, a multivariate analysis unit 304, and a grouping unit 305.

The information acquisition unit 301 acquires information from the user (comments written by the user as described later). The natural language processing unit 302 performs a natural language process on the comment acquired by the information acquisition unit 301 to extract words in a predetermined word class. The matrix generation unit 303 generates a matrix where the user and the words extracted from the comment are associated with each other. The multivariate analysis unit 304 numericalizes the acquired information (in this case, the user and words) by using the data of the matrix generated by the matrix generation unit 303.

The grouping unit 305 classifies the numericalized information into groups. The learning unit 217 groups a plurality of the information pieces by using the above configuration. More specifically, by the process of the learning unit 217, a plurality of the groups to which a plurality of the users belong is generated.

Figure 9:
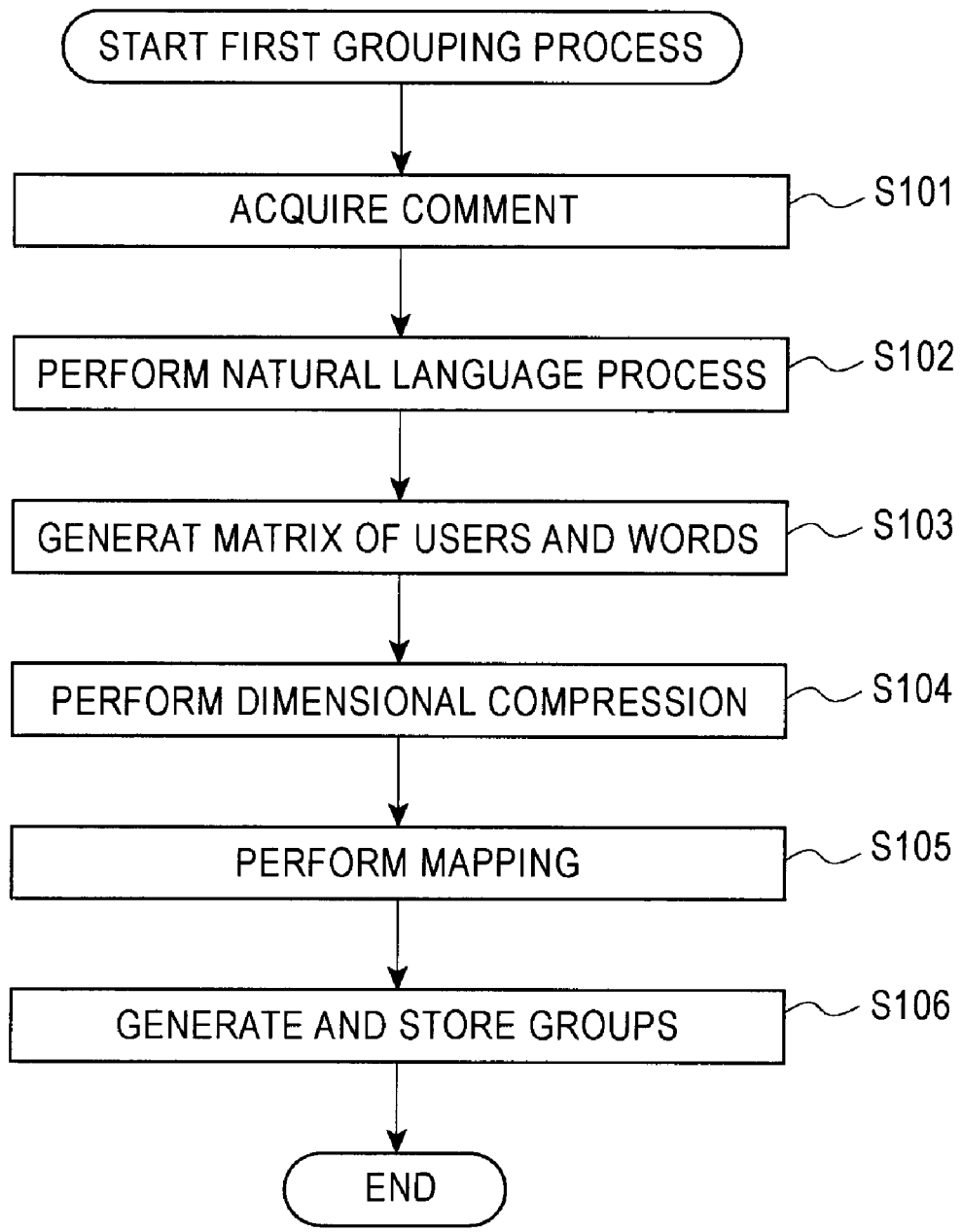
FIG. 9 is a flowchart illustrating a grouping process.

Now, the grouping process performed by the learning unit 217 is described with reference to a flowchart of FIG. 9. In Step S101, the comment is acquired by the information acquisition unit 301. The acquired comment is the information (for example, the allocated IDs or the like) specifying the predetermined user and the comment that the predetermined user writes about a predetermined item. The process of Step S101, that is, the grouping process shown in FIG. 9 is performed in the state that some numbers of users and comments are accumulated.

In Step S102, the natural language process is performed on the acquired comment. For example, the acquired comment is the comment 53 shown in FIG. 3. In the case where the comment 53 that "it is made of only the inexpensive materials" is acquired, the natural language process is performed on the comment 53, so that the comments 53 are decomposed into words. As an example of the natural language process, a morphological analysis can be used. In addition, the natural language process may be performed by applying an N-gram method or the like to cut out numbers and characters. In the case where the N-gram method or the like is applied, special characters (words) such as emoticons and special characters can be extracted.

The grouping process is a process which is performed so as to allow, for example, the impression word group 54 (FIG. 3) to be finally recommended to the user. In terms of recommendation of the impression word group 54, it is preferable that only the words in a predetermined word class rather than all the words that are decomposed by analyzing the comment 53 are used for the following processes.

For example, as the word class, there are noun, adjective, verb, adverb, conjunction, exclamation, particle, auxiliary verb, and the like. As the word class of the words recommended as the impression words to the user site, the noun, the adjective, the verb, and the adverb may be considered preferable. Therefore, as a result of the natural language process, the words extracted from the comment 53 are assumed to be the words included in the noun, the adjective, the verb, and the adverb.

In addition, the extraction of the impression words (generation of the impression word group) is performed separately from the grouping process. Therefore, the grouping process may be performed by using all the words extracted from the comment 53. However, the words extracted in the grouping process may be used for the extraction of the impression words. Accordingly, in terms of reducing the processing amount, only the word in a predetermined word class may be extracted even in the grouping process. In addition, in the grouping process, since only the words in a predetermined word class are extracted, the processing amount may be reduced in comparison with a case where a post-stage process is performed by using all the words.

In addition, for example, the words in the word class of noun or adjective are considered to reflect the user's preference. However, the words in the word class of particle or the like are not considered to surely reflect the user's preference. Therefore, in order to perform the grouping with the user's preference reflected, it is preferable that the words reflecting the user's preference are extracted and the process is performed based on the extracted words. Therefore, the description hereinafter proceeds under the assumption that the words in a predetermined word class are extracted.

In Step S103, a matrix for users and words is generated. For example, a matrix 321 shown in FIG. 10 is generated. The matrix 321 shown in FIG. 10 is a matrix where the users and the words are associated with each other. It can be understood with reference to the matrix 321 shown in FIG. 10 that the word 01 and the word 03 are extracted from the comment that the user 01 writes. In the figure, the mark o denotes that the word is extracted from the user's comment.

It can be understood from the comment written by the user 02 that the word 01 and the word 02 are extracted. It can be understood from the comment written by the user 03 that the word 02 and the word 03 are extracted. The words extracted from the comments written by the users can be found by referring to the matrix 321. In order to generate the matrix 321, the processes of Steps S101 to S103 are repetitively performed. In other words, the comment is acquired, and words in a predetermined word class are extracted from the comment. The extracted words are associated with the user who writes the acquired comment and stored in the matrix 321.

In the case of a new user, the user is newly added to the matrix 321. In the addition, the ID for identifying the user is allocated, and the user is managed by using the ID. In the case where the user and the extracted word are already registered in the matrix 321, the field at which the user and word cross is marked with o (alternatively, checked). In the case where the user is registered in the matrix 321 but the extracted word is not yet registered therein, after the new word is registered, the field at which the user and word cross is marked with o (alternatively, checked).

In this manner, the comment is acquired, and the words are extracted, so that the matrix 321 is generated. The process is ended when a predetermined number of users are processed. Next, if the matrix 321 is generated, in Step S104, a multivariate analysis (dimensional compression) is performed. For example, the matrix 322 shown in FIG. 11 is generated by performing a multivariate analysis on the information listed in the matrix 321 shown in FIG. 10. In other words, the features of the words based on the user's preference are quantified as multi-dimensional data by performing the multivariate analysis such as a correspondence analysis or a principal component analysis on the matrix 321 (the pattern of words used by a predetermined user) shown in FIG. 10. A dimensional compression method such as PLSA (LDA) may be used.

In Step S105, the mapping of information (numerical values) written in the matrix 322 is performed. For example, the mapping of the numerical values listed in the fields of dimension 1 and dimension 2 in the matrix 322 shown in FIG. 11 is considered. The dimension 1 is set to correspond to, for example, the X axis, and the dimension 2 is set to correspond to, for example, the Y axis. The features (information) of the users listed in the matrix 322 may be mapped into two dimensions constructed with two axes, that is, the X and Y axes. Due to the mapping, for example, a graph shown in FIG. 12 may be obtained.

Figure 12:
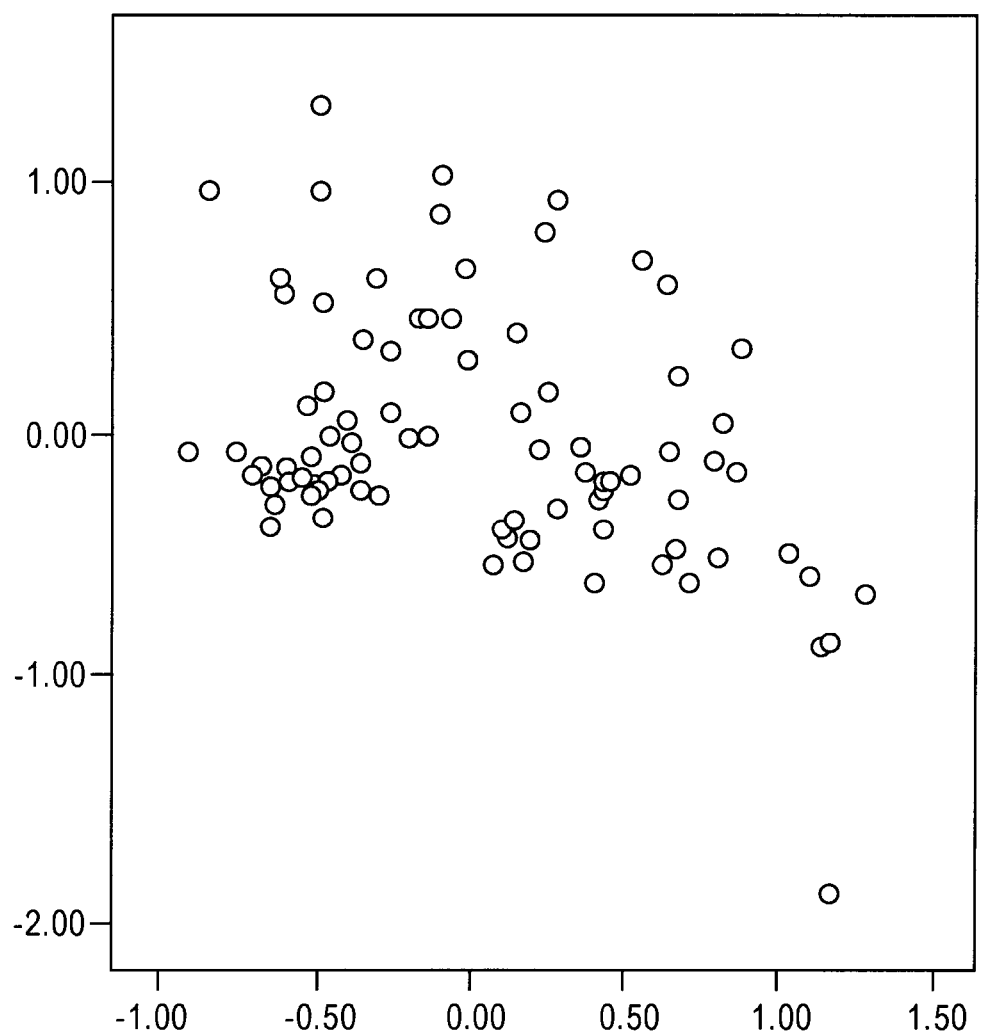
FIG. 12 is a diagram illustrating mapping.

The graph shown in FIG. 12 is an example of the mapping of the users listed in the matrix 322 shown in FIG. 11, which is performed by using the numerical values of the dimension 1 and the dimension 2 for each user. The mapping is performed on the number of users listed in the matrix 322. Since such a process is performed, the dimension in the performance of the multivariate conversion may be determined according to how many dimensions the mapping is performed into and the later-described processes are performed. For example, in the case where the mapping is performed into two dimensions and the later-described processes are performed, the multivariate conversion may be quantification into two-dimensional data.

Figure 13:
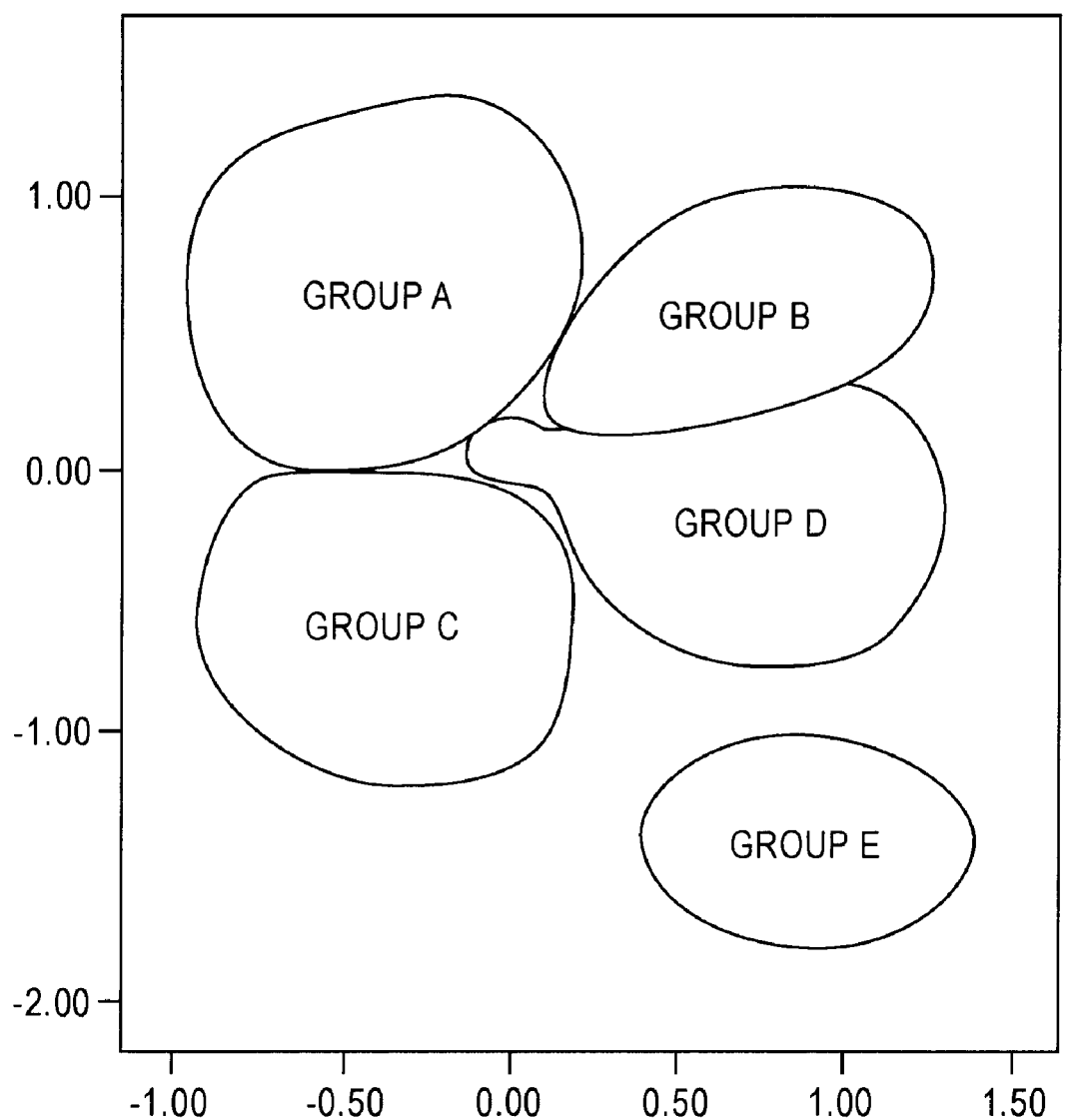
FIG. 13 is a diagram illustrating grouping.

If the graph shown in FIG. 13 is generated, in Step S106 (FIG. 9), a group is determined. With respect to the group, for example, the graph shown in FIG. 13 is analyzed, and the group is divided into meaningful portions (point-concentrated portions). The groups may be determined by allocating the divided portions to the group A, the group B, and the like. The grouping is performed by using, for example, a k-means method, a hierarchizing method, or the like.

Due to the grouping, for example, a result shown in FIG. 13 is acquired from the graph shown in FIG. 12. The result shown in FIG. 13 represents the state where the users are classified into five groups of the groups A to E. The groups are set not to be overlapped with each other. In this manner, by setting the groups not to be overlapped with each other, it may be possible to allocate one group to one user. According to a grouping method, overlapped portions may be provided between the groups, so that one user may be allocated to a plurality of the groups.

In this manner, the group is derived from predetermined information, the derived group is stored in Step S106 (FIG. 9). The group IDs identifying the groups are associated with the users (user IDs) and stored in the user database 216 (FIG. 6). For example, the user data shown in FIG. 14 are stored in the user database 216.

As shown in FIG. 14, the user IDs and the group IDs of the groups to which the users represented by the user IDs belong are associated with each other and stored in the user database 21. In the example shown in FIG. 14, it can be understood that a user of which the user ID is "0001" belongs to a group of which the group ID is "A-001", a user of which the user ID is "0002" belongs to a group of which the group ID is "B-032", and a user of which the user ID is "0003" belongs to a group of which the group ID is "A-002".

Herein, there is a description that the group ID is "A-0001". This denotes that the group "0001" is included in the group "A". In other words, the groups are hierarchized, and a predetermined user belongs to one of the hierarchized groups.

Herein, the description is made under the assumption that a user belongs to one group. However, in the case where the grouping process is performed, when there is an overlap between the groups, one user ID may be associated with a plurality of the group IDs. In other words, in this case, a predetermined user belongs to a plurality of hierarchized groups.

Figure 15:
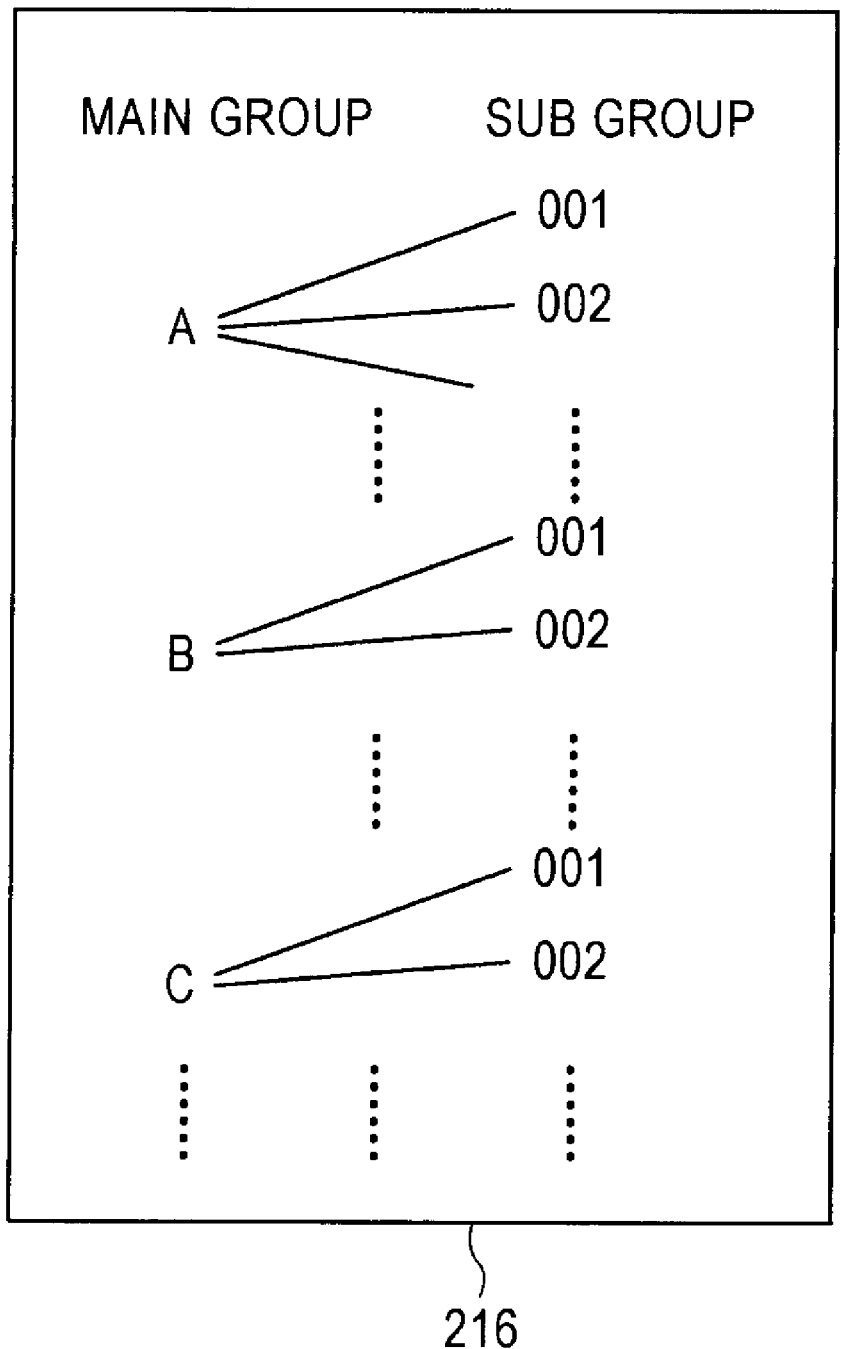
FIG. 15 is a diagram illustrating main groups and sub groups.

An example of the hierarchized groups is shown in FIG. 15. In other words, the main groups and the sub groups are set. "A-0001" denotes a group of which the main group is "A" and of which the sub group is "0001".

For example, after the main groups A to E are generated as shown in FIG. 13, analysis is performed within each of the main group, so that each main group is divided into meaningful portions (point-concentrated portions). The divided areas are sequentially allocated to a sub group 001, a sub group 002, and the like, so that the sub groups are generated.

Alternatively, after the main groups A to E are generated as shown in FIG. 13, group dividing is performed within each main group by using a method different from the method for the generation of the main groups, so that the sub groups are generated. For example, the main groups may be generated by analyzing comments, and the sub groups may be generated by performing age classification. In other words, after the main group A is generated, the users are classified according to the ages of users belonging to the main group A, so that the sub groups are generated. Although age is exemplified herein, the classification may be performed according to other types of information.

In this manner, due to the grouping, the users whose preferences, expressions, and the like are similar are classified into a plurality of the groups.

Since the users are classified into the groups having a hierarchical structure, the following operations are available. For example, the meanings of the words "risky" and "rough" are different according to age. In the case where the group of which the group ID is "A-001" is a group to which relatively many young persons belong and in which there are many users who write a comment that the item 1 is estimated to be good, the word "risky" is also recommended when a user belonging to the group of which the group ID is "A-001" writes a comment about the item 1.

On the other hand, in the case where the group of which the group ID is "A-002" is a group to which relatively many young persons belong and in which there are many user who write a comment that the item 1 is estimated not to be good, the word "risky" is not recommended when a user belonging to the group of which the group ID is "A-002" writes a comment about the item 1.

In addition, in the case where the group of which the group ID is "A-003" is a group to which relatively many old persons belong and in which there are many users who write a comment that the item 1 is estimated to be good, the word "risky" is not recommended when a user belonging to the group of which the group ID is "A-003" writes a comment about the item 1. This is because old persons have a tendency to use the word "risky" for a not-so-good case.

In the case where only the main groups are generated and the users are classified into only the main groups, in the above example, when a user belonging to the group of which the group ID is "A" writes a comment about the item 1, the word "risky" is recommended to any users or not recommended.

However, the sub groups are generated, and the detailed group classification is performed. Therefore, with respect to the users who belong to the same main group but to different sub groups, when a comment is to be written about the same item, different impression words may be recommended. In addition, for example, in the case where the sub groups are generated according to age, the same word may be used as different meanings according to age. Therefore, the impression word may be recommended to the user as the meaning according to the usage of the word among the persons in the age which the user belongs to.

In addition, although the sub group is described based on the difference in the word usage according to the age, the sub group is not limited to the example of the classification according to the age. In addition, the number of the main groups or the number of the sub groups are not limited. Although the description proceeds under the assumption that the groups are generated down to the sub groups, the lower layer groups under the sub groups may be generated. In other words, any layers may be considered. In addition, the number of the sub groups may not be the same among the main groups.

In addition, although the groups are generated down to the sub groups, in the case where the number of the users belonging to a predetermined sub group (referred to as a sub group A) is a predetermined number or less, the sub group A may be eliminated, and a process of setting the user belonging to the sub group A to belong to a sub group B that is a different sub group may be performed. In other words, a process may be performed so that a predetermined number of the users or more are registered in one sub group.

In addition, in the grouping process, the sub groups may be generated by performing plural types of the grouping with different numbers (small-number case and large-number case) allocated. Alternatively, fine grouping is performed again on the obtained groups that are obtained by performing the grouping with the small number.

Impression Word Registration

Next, the impression word registration is described. The impression word registration is performed on each group after the grouping is finished. The registration is to store impression words (words) in the impression word database 211. The impression word registration is performed by the learning unit 217, in which a result of the learning is stored in the impression word database 211.

Figure 16:
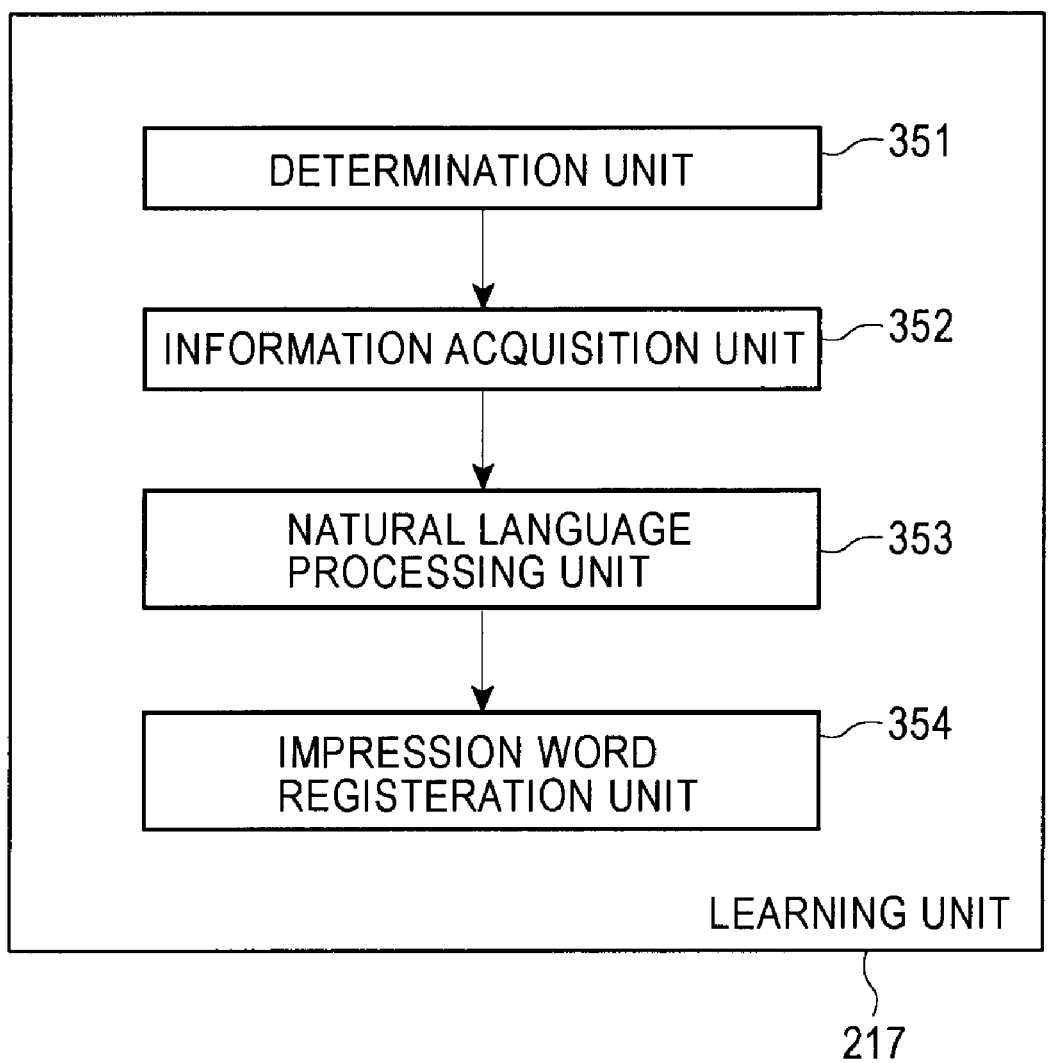
FIG. 16 is a diagram illustrating an example of a functional configuration of a learning unit.

FIG. 16 is a diagram illustrating functions associated with the impression word registration, which are extracted from the learning unit 217 (a diagram where the functions for performing the grouping process are not illustrated). The learning unit 217 associated with the impression word registration is configured to include a determination unit 351, an information acquisition unit 352, a natural language processing unit 353, and an impression word registration unit 354.

The determination unit 351 determines a group and an item of processing objects. The information acquisition unit 352 acquires a comment based on a result of the determination of the determination unit 351. The natural language processing unit 353 performs a natural language process on the comment acquired by the information acquisition unit 352 to extract words in a predetermined word class. The impression word registration unit 354 stores the process result of the natural language processing unit 353 as an impression word in the impression word database 211.

Figure 17:
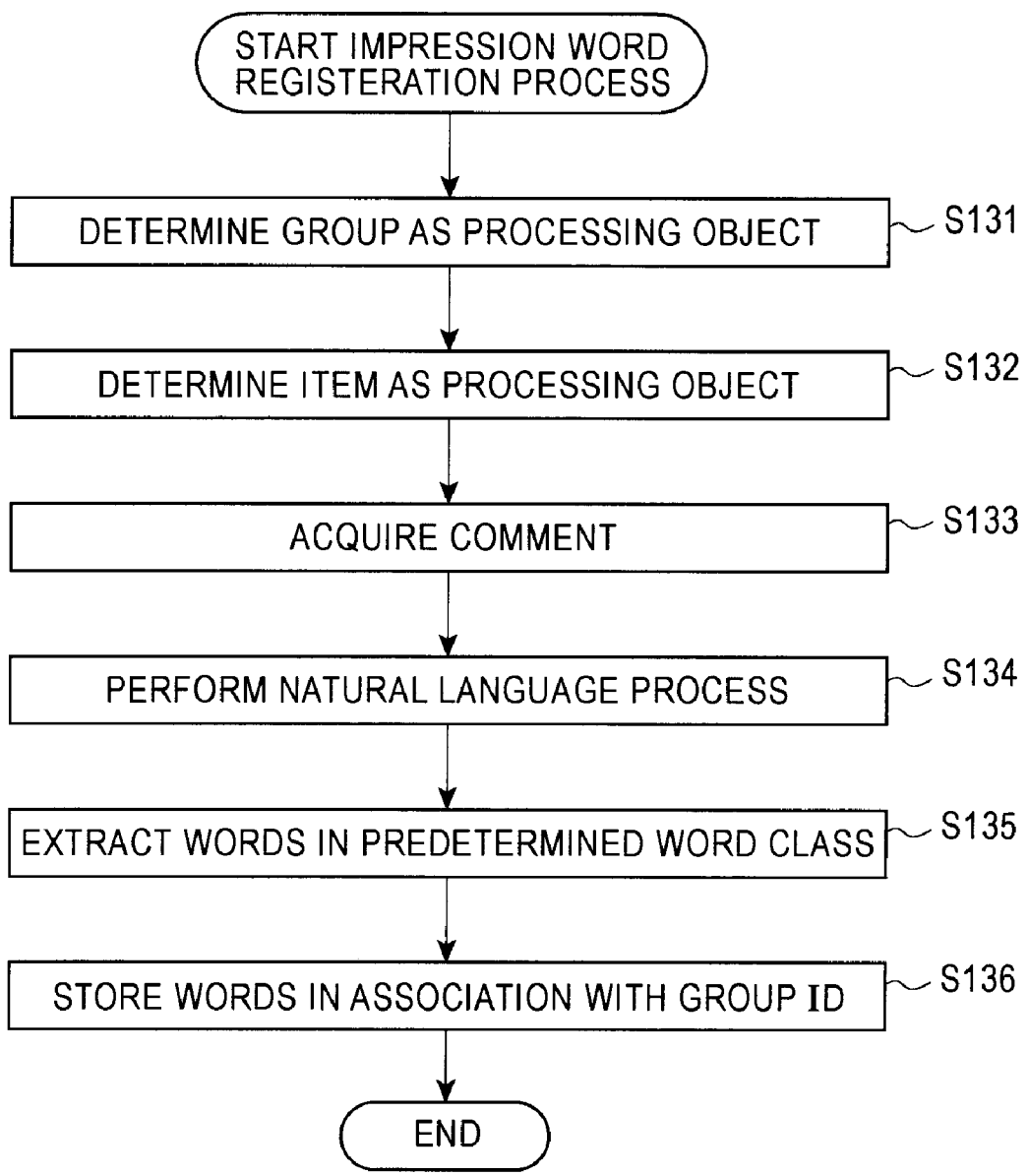
FIG. 17 is a flowchart illustrating a process associated with impression word registration.

Now, the impression word registration performed by the learning unit 217 shown in FIG. 16 is described with reference to a flowchart of FIG. 17. In Step S131, the group of the processing object is determined by the determination unit 351. As shown in FIG. 15, in the case where a main group and a sub group are generated, for example, "A-001" is determined as the processing object group.

If the group of the processing object is determined, the item of the processing object is determined by the determination unit 351 in Step S132. Herein, the item A is determined. In Step S133, the information acquisition unit 352 acquires a comment based on the result of the determination of the determination unit 351. The acquired comment is a comment that a user belonging to the group determined in the process of Step S131 writes about the item determined in the process of Step S132. In other words, in the case of this example, the acquired comment is a comment that a user belonging to the group of which group ID is "A-001" writes about the item A.

In Step S134, the natural language processing unit 353 performs a natural language process on each acquired comment. As a result, each comment is decomposed into a plurality of words. In Step S135, the natural language processing unit 353 extracts words in a predetermined word class from a plurality of the words. The processes of Step S133 to S135, that is, the process of acquiring a comment and extracting words in a predetermined word class by applying the natural language process are basically the same as the processes of Step S101 and S102 of FIG. 9 which are of the grouping process. Since the description thereof has been made hereinbefore, the detailed description thereof is omitted.

Figure 19:
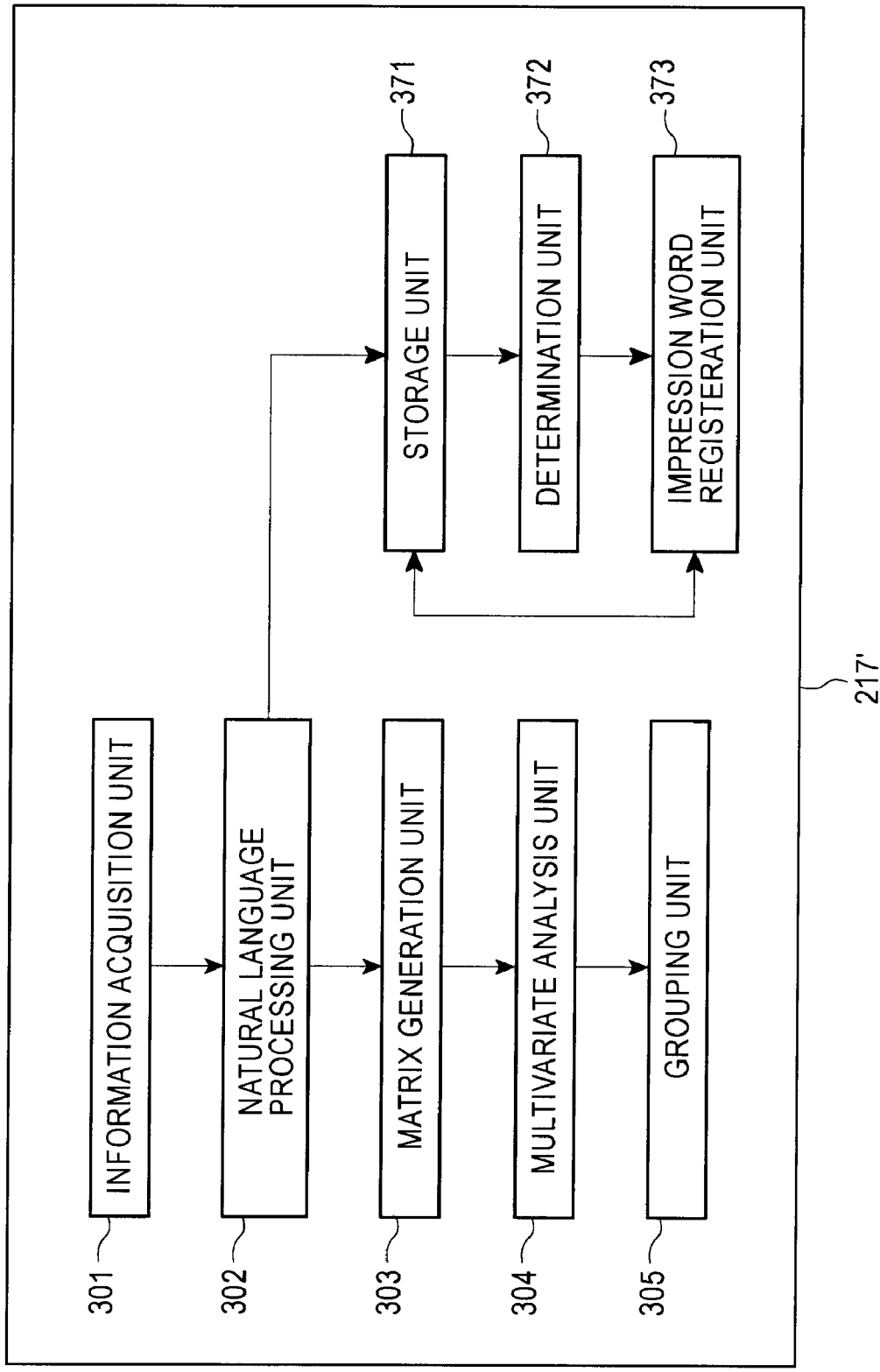
FIG. 19 is a diagram illustrating an example of a functional configuration of a learning unit.

Since the process of the impression word registration is performed similarly to some processes of the grouping process, in the learning unit 217 shown in FIG. 19, portions of performing common processes may be implemented with commonly-used configurations. The learning unit 217 shown in FIG. 19 is described later. Herein, the description proceeds under the assumption that these processes are performed by the learning unit 217 that does not have a common configuration.

In Step S136, the extracted words are stored in the impression word database 211 in association with the group ID as the impression word. Now, the data stored in the impression word database 211 are described with reference to FIG. 18.

The group ID, the item ID, and the impression word (group) are stored in the impression word database 211 in association with each other. The group IDs are IDs that are allocated to the groups generated by performing the grouping process. In addition, the group IDs are IDs that are allocated so as to identify the groups down to the lowest layer group.

In such a product selling site, in the case where items are treated in the site itself and comments can be written about the items, the item ID is an ID that is used in the site to uniquely identify a predetermined item (product). In addition, in such a blog site, in the case where items are not treated in the site itself (the site does not sell items) and items are managed for impression word recommendation, the item ID is an ID that is used in the site to uniquely identify a predetermined item. In addition, in such a blog site, in the case where items are not treated in the site itself but there is a link to a product selling site where the items are treated, the item ID is commonly used as the ID in the product selling site to uniquely identify a predetermined item.

The impression words are recommended as an impression word group to the user side. A plurality of impression words which are associated with one group ID and item ID are stored in the impression word database 211. For example, in the case where the group ID is "A-001" and the item ID is "0001", the words "uninteresting" and "tedium" are registered as the impression words. In this case, when a user belonging to the group of which the group ID is "A-001" is to write a comment about the item of which the item ID is "0001", the words "uninteresting" and "tedium" are recommended as the impression word to the user.

In addition, in the case where the group ID is the same as "A-001" but the item ID is "0002", the words "surprise" and "freshness" are registered as the impression words. Therefore, even in the case of the same group, with respect to different items, different impression words are recommended to the user.

In addition, in the case where, although the item ID is "0001", the group ID is "A-002", the words "leisurely" and "peace" are registered as the impression words. In this case, when a user belonging to the group of which the group ID is "A-002" writes a comment about the item identified by the item ID "0001", the words "leisurely" and "peace" as impression words are recommended to the user. In this manner, with respect to the same item, different impression words are recommended to the users belonging to different groups.

In this manner, the data associated with the group ID, the item ID, and the impression word (group) are stored in the impression word database 211.

Although the impression word database 211 and the user database 216 are separately prepared in this case, one database may be prepared. In the case where one database is prepared, the user ID, the group ID, the item ID, and the impression word are stored in association with each other.

In addition, although the process using the user IDs is exemplified in the description, the process may be performed by using the group IDs without using the user IDs. In other words, when the terminal 103 accesses the server 102, the group ID may be allowed to be transmitted, and the server 102 may be allowed to perform the later-described processes associated with the impression word recommendation using the group IDs.

Other Configurations of Learning Unit

Next, a configuration of a learning unit 217 in a case where the portion of performing the grouping process and the portion of performing the impression word registration are commonly used is described with reference to FIG. 19. In order to distinguish the learning unit 217' shown in FIG. 19 from the learning unit 217 shown in FIG. 8, the apostrophe sign (') is attached to the reference numeral of the learning unit 217' shown in FIG. 19.

In order to perform the grouping process as well, the learning unit 217' shown in FIG. 19 is configured to include the information acquisition unit 301, the natural language processing unit 302, the matrix generation unit 303, the multivariate analysis unit 304, and the grouping unit 305 included in the learning unit 217 shown in FIG. 8. In addition, the learning unit 217' shown in FIG. 19 is configured to include a storage unit 371, a determination unit 372, and an impression word registration unit 373.

The result of the analysis of the natural language processing unit 302, that is, the words in a predetermined word class extracted from the comment are temporarily stored in the storage unit 371. Similarly to the determination unit 351 of the learning unit 217 shown in FIG. 16, the determination unit 372 determines the group and the item as the processing object. The impression word registration unit 373 stores (registers) the impression words, which are stored in the storage unit 371, in the impression word database 211 (FIG. 6) in association with the information on the users or the items.

The impression word registration performed by the learning unit 217' is described with reference to a flowchart of FIG. 20. The group as the processing object is determined in Step S151, and the item as the processing object is determined in Step S152. The processes performed by the determination unit 372 are the same as the processes performed by the determination unit 351 of the learning unit 217 shown in FIG. 16. Since the description thereof is described in Steps S131 and S132 (FIG. 17), the detailed description thereof is omitted.

Figure 20:
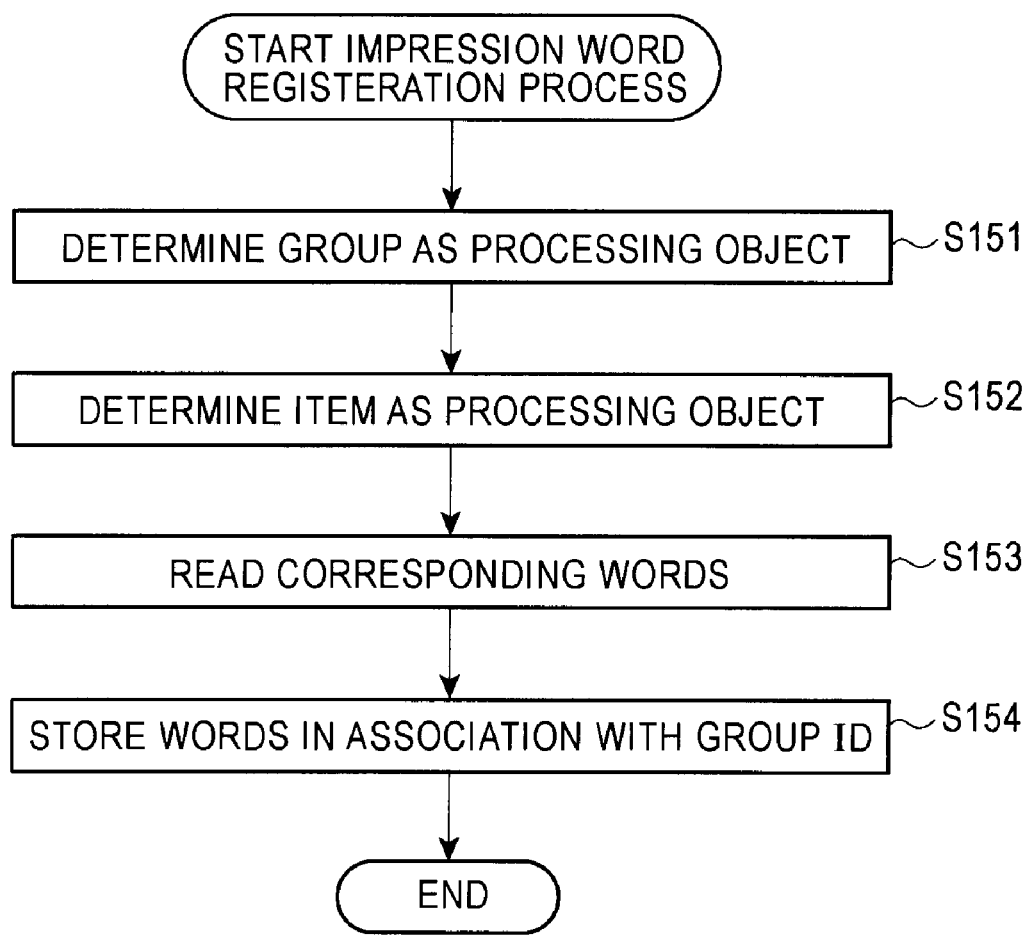
FIG. 20 is a flowchart illustrating another process associated with impression word registration.

In addition, when the flowchart of FIG. 20 is performed, the grouping process is performed in advance. Therefore, a plurality of the words, which are extracted from the users and the comments that the users write about the items, are stored in the storage unit 371 in association with the users and the items.

If a predetermined item of a predetermined group is determined by the determination unit 372 by performing the process of Step S151 and Step S152, the procedure proceeds to a process of Step S153. In Step S153, the impression word registration unit 373 reads the words stored in the storage unit 371 which are associated with the users belonging to a predetermined group and which are associated with a predetermined item. Due to the process, the impression words for the predetermined item are extracted within the predetermined group.

Therefore, in this case, the processes of Steps S133 to S135 (FIG. 17) can be omitted, and instead of the processes, the process of reading the stored word from the storage unit 371 by the impression word registration unit 373 is performed, so that the process amount can be reduced.

In Step S154, the extracted words are stored in the impression word database 211 in association with the group ID as the impression word. The data stored in the impression word database 211 is the data shown in FIG. 18 and the data associated with the group ID, the item ID, and the impression word (group).

Due to this process, the data associated with the group ID, the item ID, and the impression word (group) are stored in the impression word database 211.

For example, in the case where the number of the associated impression words is small when a predetermined group ID and a predetermined item ID are considered, or in the case where the number of the impression words is small since the number of users as the processing object or the number of comments is small, interpolation of impression words may be performed as follows.

In the case where the number of items registered in the impression word database 211 is small, a grouping process of allowing a plurality of the items to be included in a common genre or manufacturer may be performed. For example, in the case where the item A and the item B are included in the genre C, impression words associated with the item A and the item B are set to be the impression words that can be used for both of the item A and the item B. In other words, when a comment is to be written about the item A and when a comment is to be written about the item B, the same impression word is recommended.

Therefore, even in the case where the number of impression words associated with, for example, the item A is small, the interpolation can be performed by using the impression words associated with the item B.

The groups of the items may also be hierarchized. The items may be grouped in such a hierarchy that the lowest layer is set to the item (product), the upper layer is set to the category to which the item of the lowest belongs, and the upper layer thereof is set to the company for the item. In this example, in the case where the number of the impression words associated with the item is small, the impression words associated with the category that is the upper layer are recommended to the user side. In addition, in the case where the number of the impression words associated with the category is small, the impression words associated with the company associated with the upper layer thereof may be recommended.

Due to the performance of the grouping of the items, even in the case of the item which is associated with a small number of the impression words, sufficient impression words may be recommended.

Interpolation of Impression Word by Crawling

Figure 21:
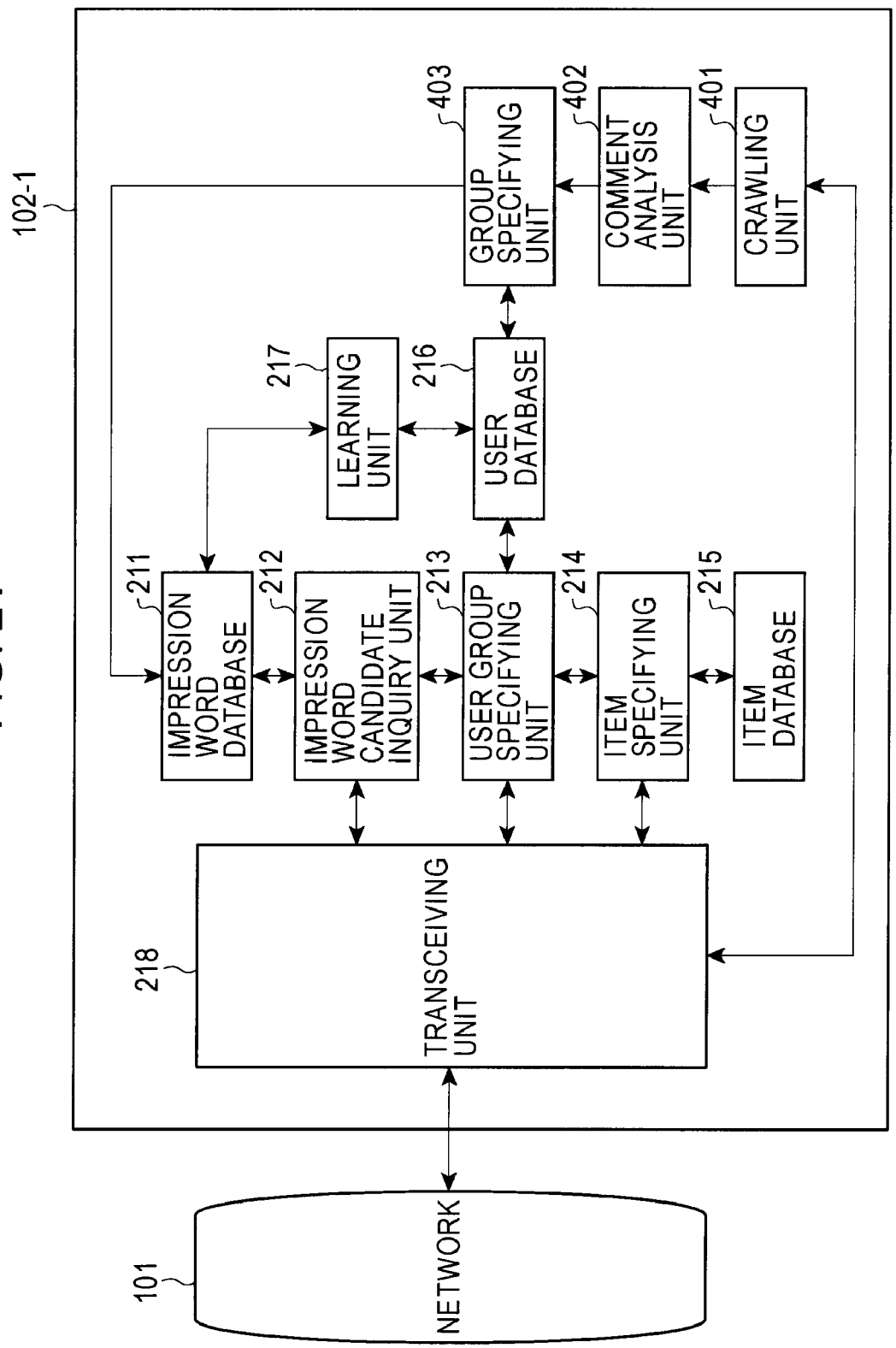
FIG. 21 is a diagram illustrating still another example of a functional configuration of a server.

As an alternative method, a method of interpolating the impression word by crawling is described. FIG. 21 is a diagram illustrating an example of a configuration of the server 102-1 that performs a crawling process. The server 102-1 shown in FIG. 21 has a configuration where a crawling unit 401, a comment analysis unit 402, and a group specifying unit 403 are added to the server 102-1 shown in FIG. 6.

The crawling unit 401 acquires information through the transceiving unit 218 from another server connected to the network 101. As an example of another server, there is a server 102-2. The server 102-2 is a provider server that supplies a blog service or the like. In the server 102-2, a comment on a predetermined item may be written in a blog managed by the server 102-2.

The crawling unit 401 collects the written comment on the predetermined item by crawling another server (webpage on the net) connected to the network 101. The collected information (in this case, the comment) is supplied to the comment analysis unit 402. The comment analysis unit 402 is configured to include, for example, the natural language processing unit 302 (FIG. 19) so as to analyze the supplied comment. The group specifying unit 403 specifies the group based on a result of the analysis.

Figure 22:
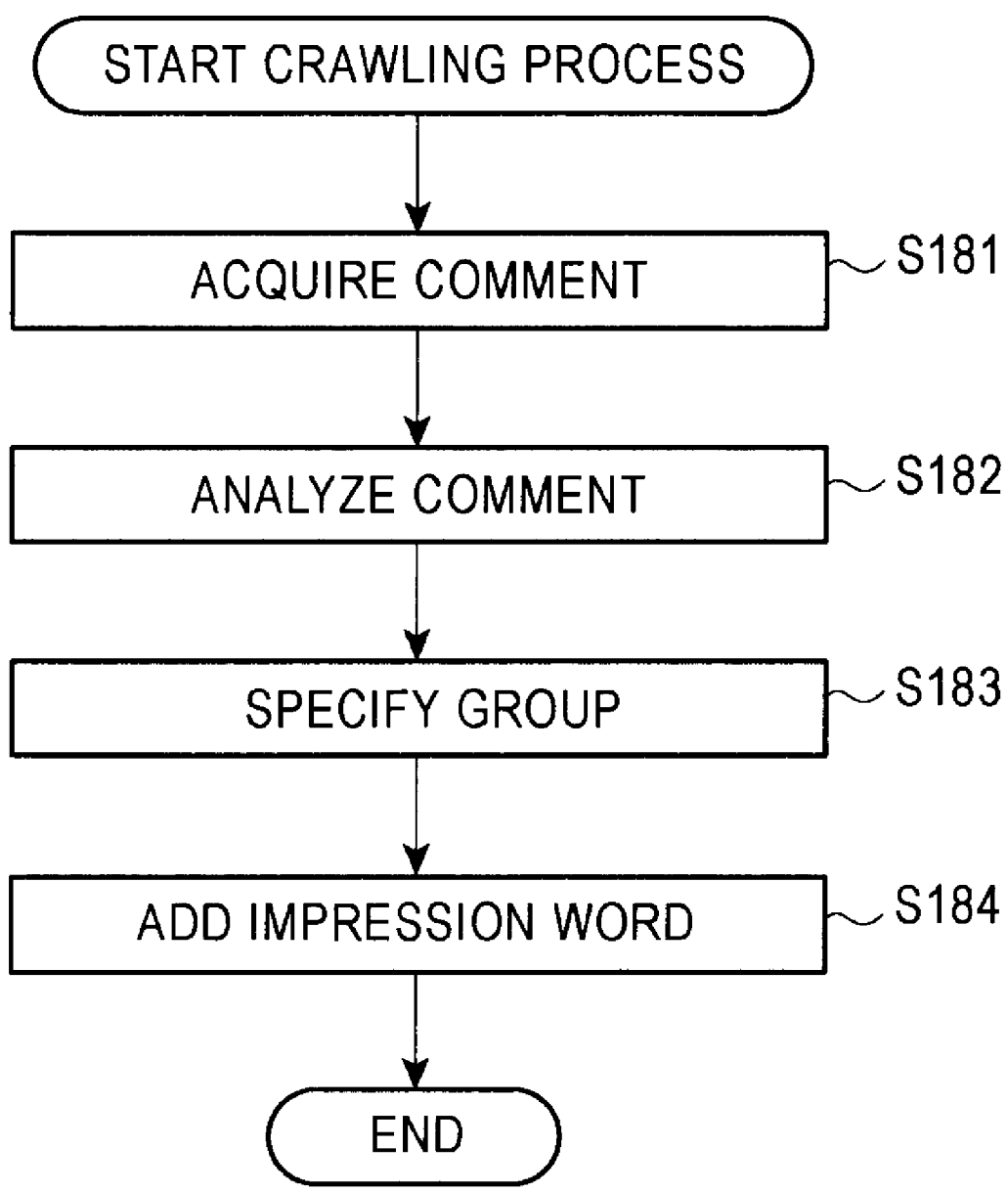
FIG. 22 is a diagram illustrating a crawling process.

The crawling process is described with reference to a flowchart of FIG. 22. In Step S181, the comment is acquired by the crawling unit 401. In Step S182, the comment acquired by the crawling unit 401 is supplied to and analyzed by the comment analysis unit 402. The comment analysis unit 402 performs a natural language process on the acquired comment to classify the comment into words and extracts words in a predetermined word class. The extracted word is supplied to the group specifying unit 403.

In Step S183, the group specifying unit 403 specifies the group to which the user writes the comment, from which the words are extracted, belongs by using the supplied words. For example, the group is specified by matching the data stored in the user database 216 with the extracted words. In the case of the performance of the process, characteristic words for each group are stored in the user database 216.

In addition, when the matching with the extracted words is performed, in this case, the data are stored in the user database 216. In the case where the matching with the data (words) is performed, the words used for generating the groups are stored in the user database 216 according to each group. Next, according to the matching with the stored words, the group to which the user who writes the comment belongs is determined.

Although the matching with the data stored in the user database 216 in this case, the matching with the impression words (words) registered in the impression word database 211 may be performed. In the case where the matching with the impression words stored in the impression word database 211 is performed, the impression word that is obtained by the crawling is associated with the group ID that is stored in association with the group ID which is associated with the impression word (group) having the highest degree of similarity.

In addition, the time when the crawling process is performed is basically the time when the number of the impression words registered in the impression word database 211 is determined to be small. In addition, in the case where the number of the impression words registered in the impression word database 211 is small, it may be understood that the number of words used at the time of generating the group is small and the amount of data stored in the user database 216 is small.

Therefore, if the matching between the impression words stored in the impression word database 211 and the extracted words are performed, the number of the words as the matching objects is small, and the matching may not be correctly performed. Accordingly, if a process of compensating for this problem is performed, the impression words may be added more efficiently. Therefore, this process may be included.

If a group is specified in Step S183, the impression words are additionally registered in the impression word database 211 in Step S184. With respect to the item about which the comment acquired by the process in Step S181 is to be written and the group specified by the process in Step S183, the words extracted by the process in Step S182 are registered as the impression words.

In this manner, the impression words may be added. In the impression word registration, if a necessary, sufficient number of the impression words are determined to be already registered with respect to a specified group and a specified item, a new impression word may not have to be registered. In addition, when the crawling unit 401 performs the crawling, the item of which the number of the registered impression words is small may be selected with reference to the impression word database 211, and the crawling may be performed on the comment about the item.

User Addition

In this manner, a process for the case where a user who is not registered in the user database 216 (FIG. 6) accesses after the groups of user are generated and the impression words are registered is described with reference to a flowchart of FIG. 23.

In Step S201, in the case where there is an access of a predetermined user through the transceiving unit 218, the user group specifying unit 213 determines with reference to the user database 216 whether the user is a registered user or not. For example, when a predetermined user accesses the server 102 by manipulating the terminal 103, the user ID is transmitted from the terminal 103. In the case where a user ID matching with the transmitted user ID is registered in the user database 216, the user group specifying unit 213 determines that the user is not a new user. On the other hand, in the case where a user ID matching with the transmitted user ID is not registered in the user database 216 or in the case where any user ID is not transmitted, the user group specifying unit 213 determines the user is a new user.

In Step S202, in the case where the user is determined to be a new user, the comment written by the user is acquired. The user group specifying unit 213 may be allowed to perform the natural language process on the acquired comment so as to extract words in a predetermined word class. Alternatively, the process may be performed by the learning unit 217. If words in a predetermined word class are extracted from the comment, the procedure proceeds to a process of Step S203.

In Step S203, the impression word database 211 is referred to. The user group specifying unit 213 instructs the item specifying unit 214 to specify the item about which the comment, from which the words are extracted, is to be written. As a result, the item ID is acquired. The user group specifying unit 213 instructs the impression word candidate inquiry unit 212 to read the impression words for the acquired item ID from the impression word database 211.

As a result, the impression words for a predetermined item are acquired according to the groups (group IDs). If the impression words are acquired, in Step S204, the user group specifying unit 213 performs the matching process using the words extracted from the comment and the acquired impression words. In Step S205, the group is specified by using a result of the matching. As a result of the matching, a group associated with the impression word having the highest degree of similarity is determined to be a group for the new user.

In response to the determination, in Step S206, the user group specifying unit 213 adds the new user to the user database 216. The user group specifying unit 213 allocates a user ID to the new user and registers the new user in the user database 216 in association with the specified group ID.

In this manner, the new user is added. In addition, in the case where the number of users registered in the user database 216 is a predetermined number or more due to the addition of the new users, the grouping process shown in FIG. 9 may be performed again.

Processes Associated with Impression Word Recommendation

Figure 24:
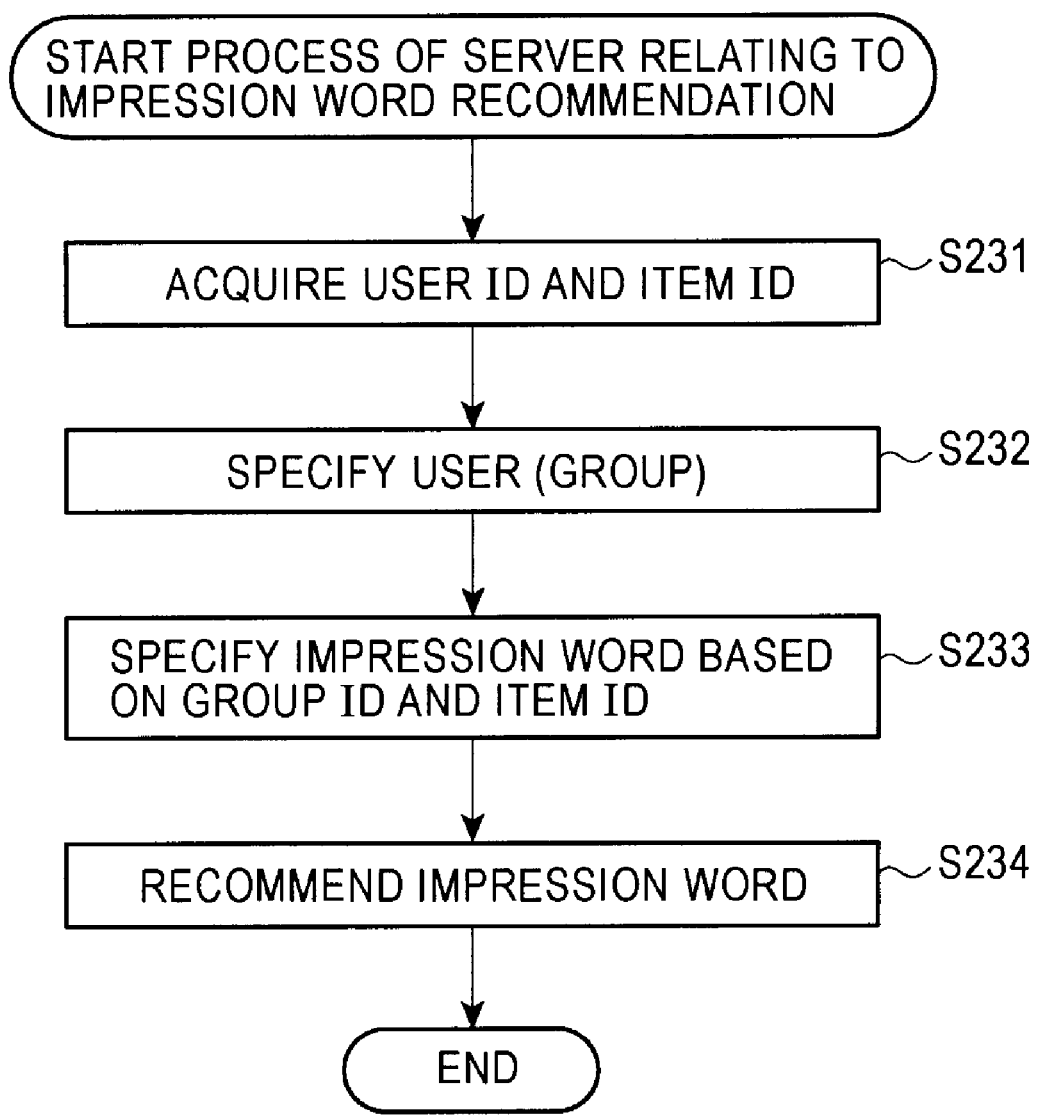
FIG. 24 is a flowchart illustrating a process associated with impression word recommendation.

Next, the process of the server 102-1 (FIG. 6) when the impression words are recommended to the user registered in the user database 216 is described with reference to the flowchart of FIG. 24. The flowchart of FIG. 24 is performed under the assumption that the user permits the impression word recommendation (desires the impression word recommendation).

In other words, there is a mechanism where the user side may select whether or not the impression words are recommended. The above flowchart is performed when the user permits the recommendation. For example, the user side is provided with options of "select from candidates", "select from candidates and edit", and "comment irrespective of candidates". If the option of "select from candidates" or "select from candidates and edit" is selected, the impression word recommendation process is performed. In addition, when the impression words are recommended to the user side, the options together with the impression words may be recommended. In this case, the impression word recommendation process is performed. However, if the option of "comment irrespective of candidates" is selected, the impression word recommendation process is allowed to stop.

In addition, the impression word recommendation process is performed when the users is to write a comment about a predetermined item. In other words, when the user is to write a comment in a comment field 12-2 of the window 10 shown in FIG. 1 which is displayed to the user side, the impression word recommendation process is performed.

In Step S231, the server 102-1 acquires a user ID and an item ID. When the comment is to be written in the side of the terminal 103-1, the item ID of the item corresponding to the comment field 12-2 in which the user is to write the comment through the comment input unit 201 and the user ID stored in a storage unit (not shown) are transmitted through the transceiving unit 204 and the network 101 to the server 102-1. The server 102-1 receives the item ID and the user ID, which are transmitted from the side of the terminal 103-1, through the transceiving unit 218. The received user ID is supplied to the user group specifying unit 213, and the received item ID is supplied to the impression word candidate inquiry unit 212.

In Step S232, the user group specifying unit 213 reads the data matching with the supplied user ID by referring to the user database 216. As shown in FIG. 14, the data which are associated with the user IDs and the group IDs are stored in the user database 216. By referring to the user database 216, the group IDs corresponding to the user IDs are read.

Figure 23:
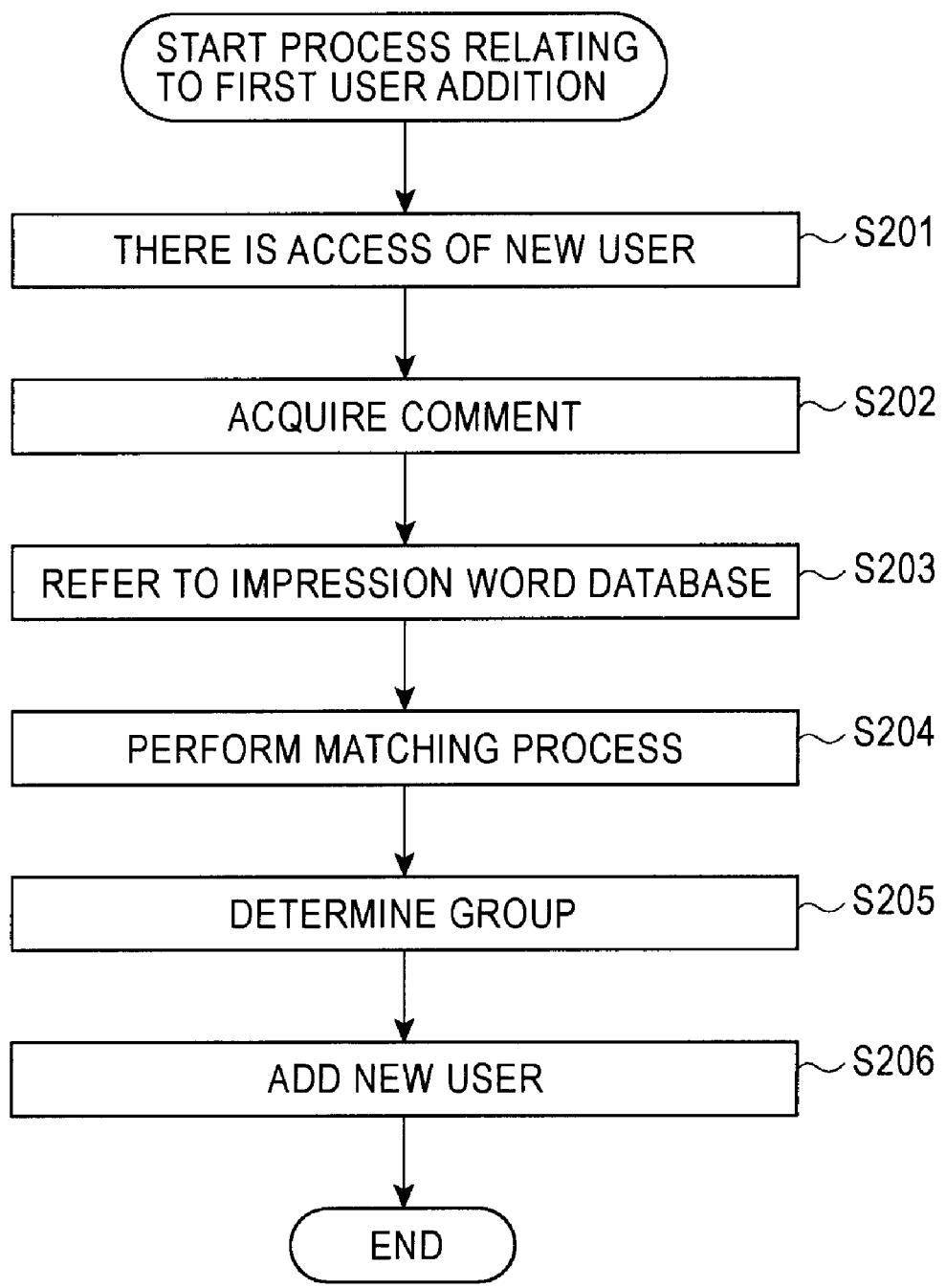
FIG. 23 is a flowchart illustrating a process associated with user addition.

If the supplied user ID is not stored in the user database 216, the user is determined to be a new user, and the processes associated with the user addition shown in FIG. 23 may be performed. By performing the processes associated with the user addition, the group to which the user belongs may be determined in Step S205. With respect to the new user, the group ID of the determined group may be used, and the following processes may be performed.

In addition, in the case where the group IDs are set to be transmitted from the terminal 103, the process of Step S232 may be omitted.

In Step S233, the impression word candidate inquiry unit 212 specifies the impression words 15 (impression word group 14) to be recommended to the user side with reference to the impression word database 211. The item IDs from the transceiving unit 218 and the group IDs from the user group specifying unit 213 are supplied to the impression word candidate inquiry unit 212.

The impression word candidate inquiry unit 212 reads impression words, which are associated with the group IDs matching with the supplied group IDs and the item IDs matching with the supplied item IDs, with reference to the impression word database 211. For example, In the case where the group ID is specified by "A-001" and the item ID is specified by "0001", the words "uninteresting" and "tedium" are read as the impression words (refer to FIG. 18).

In Step S234, the impression word candidate inquiry unit 212 transmits the impression words, which are read from the impression word database 211, through the transceiving unit 218 to the terminal 103-1. At the side of the terminal 103-1, the comment candidate recommendation unit 202 receives the impression words transmitted through the transceiving unit 204. Next, due to the process of the comment candidate recommendation unit 202, the impression word group 14, for example, shown in FIG. 1 is displayed in the screen on the display that the user refers to. The user can write the comment 13 by selecting words appropriate for writing the comments 13 from the impression word group 14 of by selecting and editing the words.

In this manner, the server 102-1 may read the impression words specified by the user IDs and the item IDs from the impression word database 211 managed by the server and may recommend the impression words to the user side. In addition, although the impression word database 211 is described to be managed by the server 102-1, the impression word database 211 may be managed by another apparatus that is connected through the network 101, and the apparatus may be accessed so as to acquire the impression words if necessary. In addition, one impression word database 211 may be managed and shared by a plurality of servers.

Referring to the flowchart of FIG. 24 again, in step S233, the impression words are specified by the group IDs and the item IDs. At this time, it is not preferable that, if the number of the specified impression words is small, the number of the impression words recommended to the user is also small. In order to prevent this problem, the process of the impression word recommendation may be performed according to the flowchart shown in FIG. 25 by using the hierarchical structure of the groups.

Other Processes of Impression Word Recommendation

Figure 25:
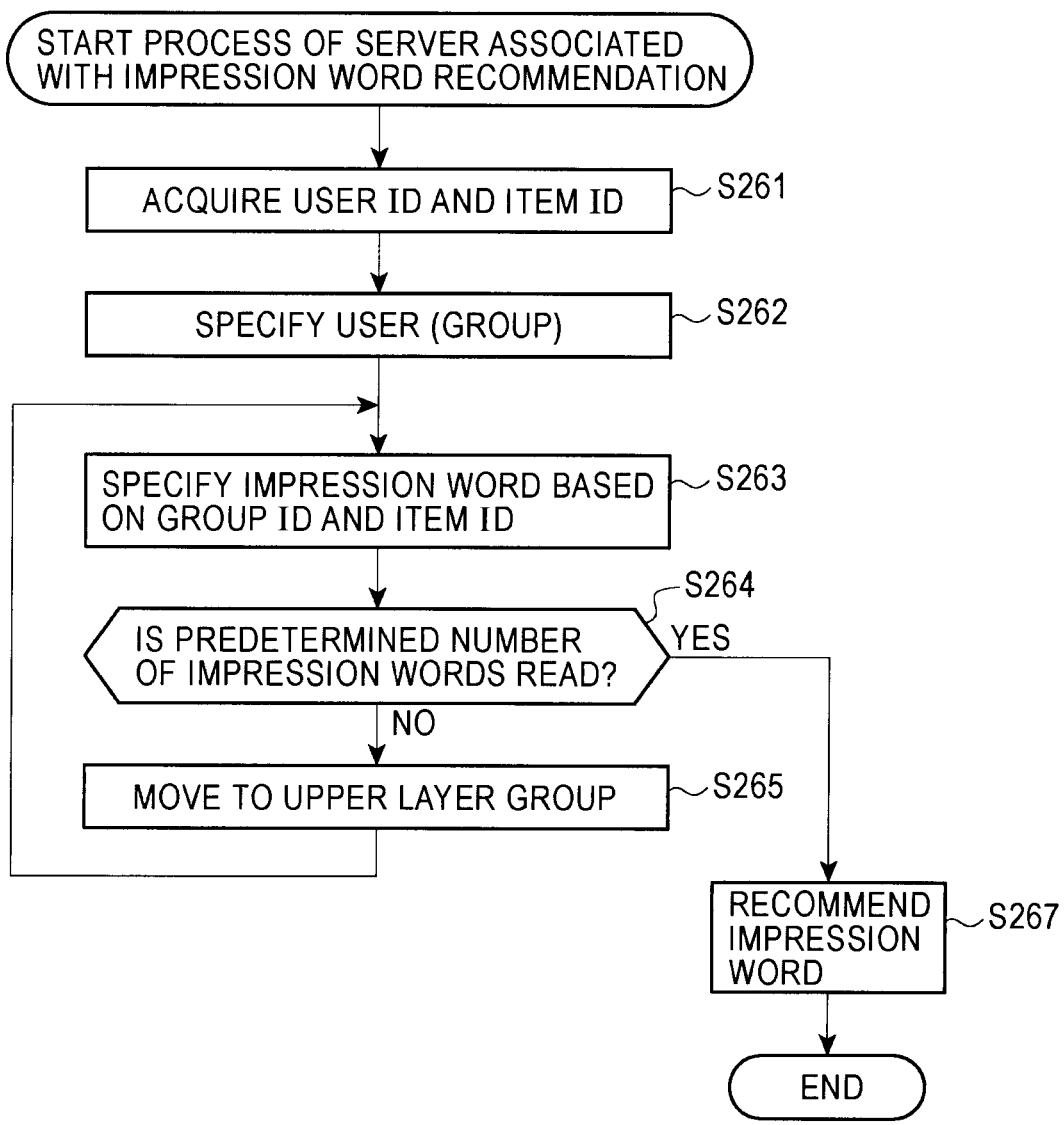
FIG. 25 is a flowchart illustrating another process associated with impression word recommendation.

A flowchart of FIG. 25 is referred to. In Step S261, the user ID and the item ID are acquired. In Step S262, the group is specified. In Step S263, the impression word is specified according to the group ID and the item ID. Since the processes of Steps S261 to S263 are the same as Steps S231 to S233 of the flowchart of FIG. 24, the description thereof is omitted.

In Step S264, it is determined whether or not a predetermined number of impression words are read out. The impression word candidate inquiry unit 212 determines whether or not the number of the impression words read out from the impression word database 211 is smaller than a predetermined number. In order to perform the process, the impression word candidate inquiry unit 212 stores the predetermined number. For example, the predetermined number may be 5. In addition, for example, the predetermined number may be set to be equal to the number of the impression words recommended as the impression word group 14.

In the case where a predetermined number of the impression words are determined not to be read out in Step S264, the procedure proceeds to a process of Step S265. In Step S265, the impression word candidate inquiry unit 212 moves to the upper hierarchical group, and the process of Step S263 and the following processes are performed again in the group. In other words, in the case where the number of the impression words that are read from the sub group is small, the impression word candidate inquiry unit 212 moves to the main group so that the impression words are read from the main group.

For example, it is assumed that the group ID specified by the user ID transmitted from the server 102-1 is "A-001". The group ID indicates that the main group is "A" and the sub group is "001" in the main group. In this case, first, the impression words associated with the sub group of which the group ID is "A-001" are read. If the number of the read impression words is equal to or less than a predetermined number, the impression words associated with the main group of which the group ID is "A" are read.

In this manner, until the number of the read impression words is equal to or larger than a predetermined number, impression word candidate inquiry unit 212 moves from the lowest layer group toward the upper layer group to perform the reading of the impression words. Therefore, in the case where the number of the read impression words is determined to be equal to or larger than the predetermined number in Step S264, the procedure proceeds to a process of Step S267, in which the read-out impression words are transmitted through the transceiving unit 218 to the terminal 103-1.

In this manner, even in the case where the number of impression words is small, by widening the search range from the lower layer toward the upper layer sequentially, an appropriate number of impression words may be recommended to the user side.

Hereinbefore, the case where the number of impression words is small is exemplified. On the contrary, in the case where the number of impression words is large, the following processes are performed, for example, before Step S267. In other words, in the case where the number of the recommended impression words is large, the impression words are sorted according to the usage frequency thereof, and a predetermined number of the impression words in the upper layer are recommended. When the impression word registration process is performed, the comment is acquired, and the usage frequency of the impression word denotes the frequency of the impression word which is used for the acquired comment. In addition, when the impression words are recommended, the usage frequency denotes that frequency of user's selection, that is, the frequency that the impression word is used.

The impression words are sorted in the order of the usage frequency, that is, in the order from the highest usage frequency. The sorted impression words are recommended to the user side in the sorted order, so that the user may easily select the impression words. Therefore, usability may be improved.

In this manner, in the case where the impression word recommendation is performed and the user writes the comment 13, or the case where the impression word recommendation to the user is not performed and the comment 13 is written, the words included in the comment may be added as new impression words in the impression word database 211.

For example, the added words (impression words) may be obtained as follows. In the side of the terminal 103-1, words in a predetermined word class are extracted from the comment by performing a method such as a morphological analysis or a context analysis, and the extracted words are transmitted to the side of the server 102-1. Alternatively, in the side of the server 102-1, a written comment 13 may be acquired; words in a predetermined word class may be extracted by performing a process on the comment in the natural language processing unit 302 of the learning unit 217'; and the extracted words may be registered in the impression word database 211 in association with the group ID or the item ID. In this case, since the group ID or the item ID is already acquired, the registration process may be performed by using the information thereof.

Embodiment of Second Grouping

In the aforementioned embodiment of the first grouping, the groups are generated by using a comment which a predetermined user writes about a predetermined item. Therefore, similar comments and users who write comments with a similar expression are classified into the same group. The users who write the comments with a similar expression are considered to have similar preferences. In addition, in the case where users having similar preferences may be desired to be grouped, the grouping may be performed by using information on the preference.

Now, an embodiment of second grouping using information on a preference is described. Since the second grouping process is also performed by the learning unit 217 shown in FIG. 8 or the learning unit 217' shown in FIG. 19 and the configurations thereof are the same, the description thereof is omitted. In addition, the description hereinafter proceeds under the assumption that the second grouping process is performed by the learning unit 217 shown in FIG. 8.

Figure 26:
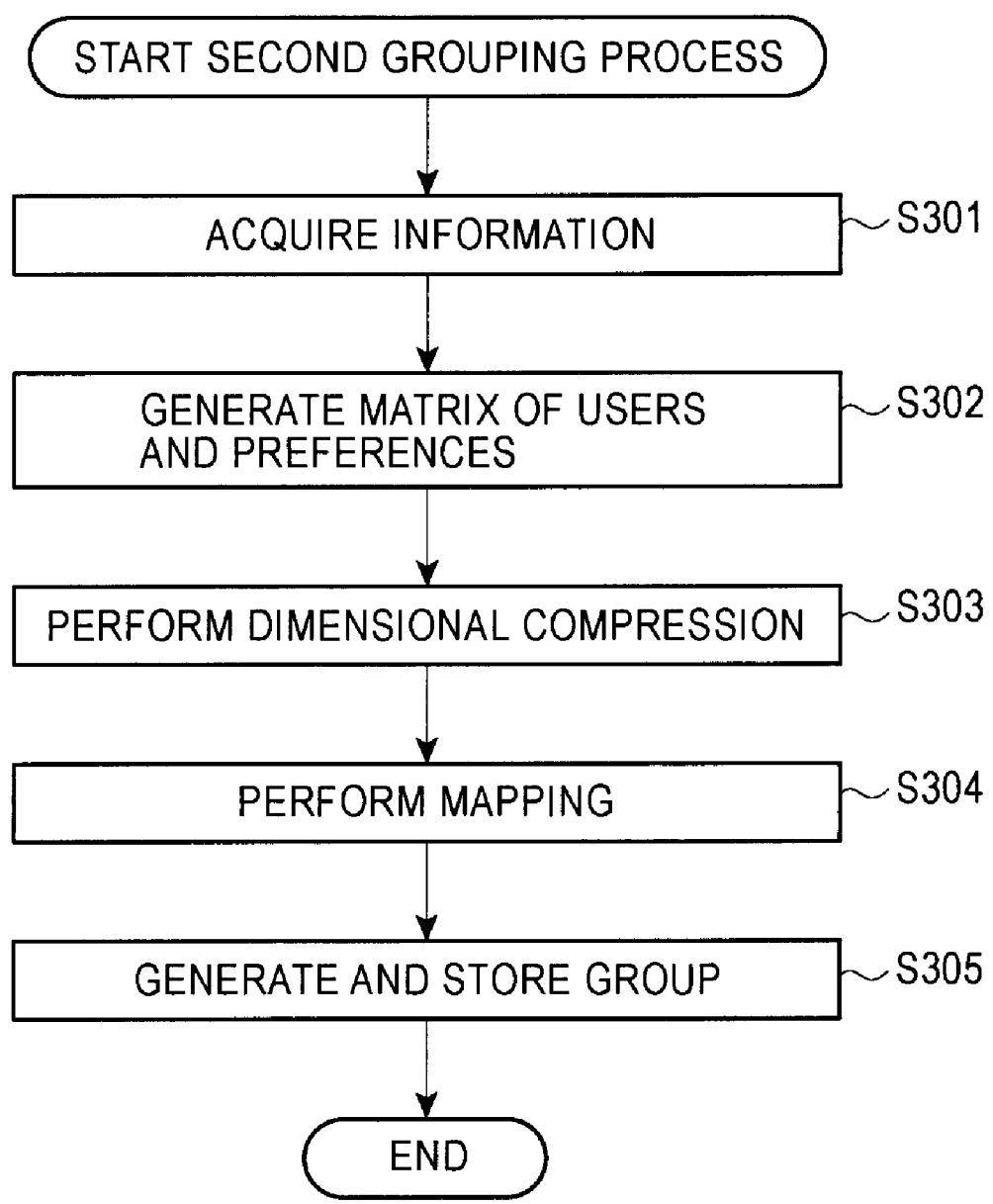
FIG. 26 is a flowchart illustrating another grouping process.

Now, the second grouping process performed by the learning unit 217 is described with reference to a flowchart of FIG. 26. In Step S301, information is acquired. The acquired information is the information on the user's preferences. In Step S302, a matrix of users and preferences is generated by using the acquired information.

The generated matrix is, for example, a matrix 501 shown in FIG. 27. The matrix 501 shown in FIG. 27 is data in a form of a matrix where the users and the music pieces which the users reply that they like are associated with each other. It can be understood with reference to the matrix 501 shown in FIG. 27 that the user 01 replies that the user 01 likes the music pieces 01 and 03. In addition, it can be understood with reference to the matrix 501 that the user 02 replies that the user 02 likes the music piece 02 and that the user 03 replies that the user 03 likes the music pieces 03 and M.

Such a matrix 501 may be generated by collecting the results of questionnaire that is conducted on the users. The questionnaire may be conducted on the users, for example, on the network or through a paper medium. In addition, as the contents of the questionnaire, for example, there is whether or not a music piece is liked. FIG. 27 illustrates a matrix where favorite music pieces are marked by o.

In addition, the matrix 501 shown in FIG. 27 may be generated from purchase history. In this case, the matrix 501 shown in FIG. 27 is data in a form of matrix where the users and the music pieces which are bought by the users are associated with each other. In this case, it can be understood that the user 01 buys the music pieces 01 and 03 from the matrix 501, the user 02 buys the music piece 02, and the user 03 buys the music pieces 03 and M.

The information on the preference of the users may be acquired by using such a questionnaire form. In addition, the information on the preference of the users may be acquired from the information of the purchase history. In the example shown in FIG. 27, the items are music pieces. However, with respect to other types of items, such a matrix 501 may be generated. Next, the matrix 501 shown in FIG. 27 that is generated from the acquired information is acquired in the process of Step S301 by the information acquisition unit 301 of the learning unit 217. Next, the matrix 501 is generated by the matrix generation unit 303.

In addition, although the natural language processing unit 302 is provided to the learning unit 217 shown in FIG. 8, since the natural language processing unit 302 may not have to be provided for performing the second grouping process, a configuration where the natural language processing unit 302 is removed from the learning unit 217 may be used as a configuration of the learning unit 217. In addition, in the case of the natural language processing unit 302 is configured to be provided, the information acquired from the information acquisition unit 301 is used as a comment about, for example, a predetermined music piece, and the natural language process may be performed on the comment. Next, after the natural language process, liking or disliking is determined by determining whether or not a favorable word is used. The result of the determination may also be used as information when the matrix generation unit 303 generates the matrix 501.

If the matrix 501 is generated by the matrix generation unit 303, the procedure proceeds to a process of Step S303. In Step S303, the dimensional compression process is performed based on the matrix 501. By performing the dimensional compression, the matrix 322 shown in FIG. 11 is generated. The process of Step S303 is performed similarly to the process of Step S104 shown in FIG. 9. In other words, the matrices as the objects of the dimensional compression are different, but the processes thereof are the same.

If the mapping is performed in Step S304, the groups are generated and stored in Step S305. The process is also the same as the processes of Steps S105 and S106 shown in FIG. 9, the detailed description thereof is omitted. By performing the grouping process, the data that are associated with the user IDs and the group IDs as shown in FIG. 14 are stored in the user database 216.

In this manner, the grouping may be performed based on the information indicating the preference of the user. In addition, similarly to the first grouping process, the processes of generating the main groups and the sub groups as a result of the grouping may also be performed in the second grouping process.

In this manner, the groups may be generated by performing the dimensional compression on a matrix of users and a set of contents selected (favored) by the users and performing the grouping using the principal component scores. In addition, the dimensional compression may be performed by applying a dimensional compression method other than principal component analysis. In addition, in the case where the grouping is performed by using binary data such as select/non-select or liking/disliking, a categorical principal component analysis may be used; and in the case where step evaluation or the like can be obtained, a principal component analysis may be used. In addition, in the case where the number of contents is not large, the grouping process may be performed without performance of the dimensional compression.

The impression word registration process is performed after the grouping process is ended. However, the impression word registration process is performed in the same manner as the aforementioned embodiment. In other words, the impression word registration process is performed based on the flowchart shown in FIG. 17. Since the processes are described above based on the flowchart shown in FIG. 17, the description thereof is omitted herein.

Second New User Addition Process

Figure 28:
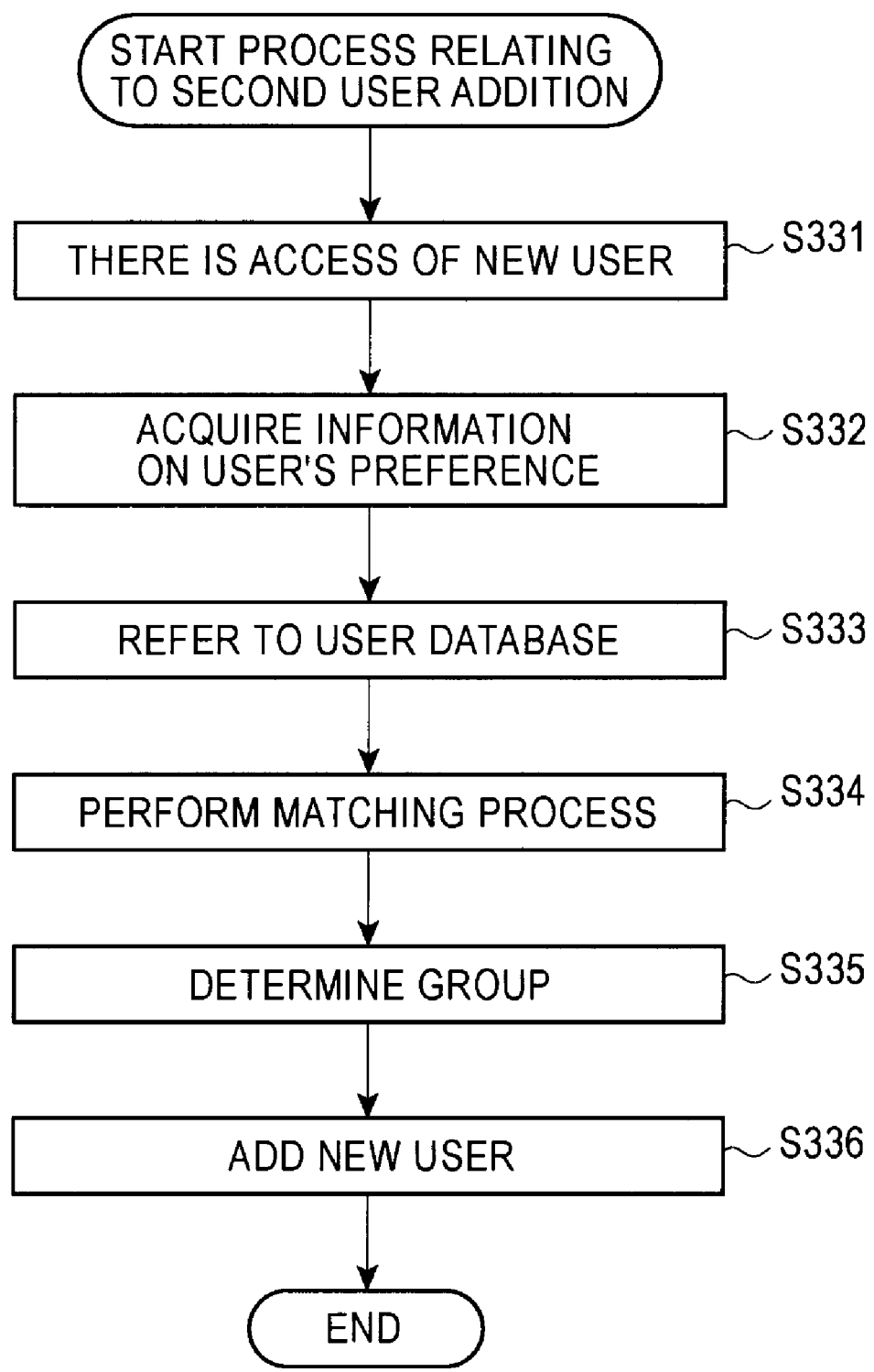
FIG. 28 is a flowchart illustrating another process associated with user addition.

Now, a process when the new user is added after the generation of groups and the registration of impression words is described. In terms of the situation, this process is the same as the aforementioned process of the flowchart shown in FIG. 23. However, when the grouping is performed based on the information on the user's preference, a new user addition process is performed based on the flowchart shown in FIG. 28. In the description hereinafter, the portion where the process similar to the flowchart shown in FIG. 23 is described in brief.

If there is an access of a new user in Step S331, the information on the user's preference is acquired in Step S332. As the information on the preference, similarly to the information acquired at the time of performing the grouping process, there is a result of a reply to a binary questionnaire, that is, user's liking or disliking or a purchase history. In Step S333, the user database 216 is referred to in Step S333, and the matching process is performed in Step S334.

The matching process is performed by calculating a degree of similarity between a pattern of an item that the new user replies that the new user likes (for example, a pattern where the new user likes the music piece 1 and the music piece 3) and a pattern of an item that the user registered in the user database 216 replies that the user likes. Therefore, the user having a high degree of similarity is extracted, and the group ID of the user is read out. Due to the reading of the group ID, the group of the new user is determined (Step S335). Next, in Step S336, the information on the new user is registered in the user database 216 in association with the determined group ID.

Due to the process, when there is an access of a new user, the user is additionally registered in the user database 216.

Since the processes associated with the impression word recommendation is described with reference to the flowchart of FIG. 24 or the flowchart of FIG. 25, the description thereof is omitted.

In addition, the first grouping process where the grouping is performed based on the comment and the second grouping process where the grouping is performed based on the information of the preference may be performed in the same system. In addition, in the case where the first and second grouping processes are performed in the same system, with respect to the process for the new user, the first user addition process which is performed based on the acquired comment and the second user addition process which is performed based on the acquired information of the preference may be selectively performed, so that the group may be specified.

According to the aforementioned embodiment, when a user is to write an impression (comment) about a predetermined item, candidates of the impression word may be recommended to the user. In addition, the recommended impression words may be words or expressions which the users having a similar preference easily use. In addition, the recommended impression words may be words which are easily used in the group where similar expressions are easily used.

In addition, due to the recommendation of the impression words, inputting of the comment may be simplified when the user inputs the comment. Due to the simplification of the inputting, a user's motivation to write the comment may be increased. In addition, although a user has a poor ability to write the comment, power of expression may be increased due to the recommendation of the candidates. In addition, since the candidates that the user easily uses are recommended according to the feature of the user's expression or the user's preference, the user's motivation to input the comment may be increased. In addition, if the input process is used for learning, the group to which the user belongs may be optimized, and thus, the following candidate recommendation may be performed at a high accuracy.

Recording Medium

A series of the aforementioned processes may be executed in a hardware manner or in a software manner. In the case where a series of the processes are executed in a software manner, a program constituting the software is installed in a computer. The computer includes a computer which is assembled into dedicated hardware or a general-purpose computer where various programs are installed to execute various functions.

A personal computer may be constructed to have a configuration that is the same as, for example, the configuration of the server 102 shown in FIG. 5. A CPU 151 loads a program stored in, for example, a storage unit 158 on a RAM 153 through an input/output interface 155 and a bus 154 to execute a series of the aforementioned processes.

The program executed by the computer (CPU 151) may be provided in a form where the program is recorded on a remote media 161 such as a package media. In addition, the program may be provided via a wired or wireless transmission medium such as a local area network, the Internet, digital satellite broadcast, or the like.

In the computer, the program may be installed in the storage unit 158 through the input/output interface 155 by mounting the remote media 161 on a drive 160. In addition, the program may be received through a communication unit 159 via a wired or wireless transmission medium and installed in the storage unit 158. Alternatively, the program may be installed in a ROM 152 or the storage unit 158 in advance.

In addition, the program executed by the computer may be a program which may be performed in a time sequence according to the order described in the specification or a program that may be performed in parallel or at a necessary timing such as a calling time.

In addition, in the specification, the system denotes the entire apparatus that is constructed with a plurality of apparatuses.

The present application contains subject matter related to that disclosed in Japanese Priority Patent Application JP 2009-138516 filed in the Japan Patent Office on Jun. 9, 2009, the entire content of which is hereby incorporated by reference.

It should be understood by those skilled in the art that various modifications, combinations, sub-combinations, and alterations may occur depending on design requirements and other factors insofar as they are within the scope of the appended claims or the equivalents thereof.

What is claimed is:

1. An information process apparatus comprising:
   an extraction means which is configured to extract words in a predetermined word class from comments which predetermined users write about a predetermined item;
   a grouping means which is configured to group the predetermined users by performing a multivariate analysis using the words extracted by the extraction means, wherein the grouping means generates a matrix of the users and the words and performs a dimensional compression using the matrix, performs mapping of a result of the dimensional compression, and classifies the users into a plurality of groups by using a result of the mapping;
   a storage means which is configured to store the groups, the predetermined item, and the words in association with each other;
   a determination means which is configured to determine which group a user who is to write a comment belongs to when the user is to write the comment about the predetermined item; and
   a reading means which is configured to read from the storage means words which are associated with the group determined by the determination means and the predetermined item which the comment is to be written about.

2. The information process apparatus according to claim 1, wherein the groups are hierarchized, and
   wherein the reading means reads the words sequentially from the lowest layer group, and if the number of the words associated with the lower layer group is a predetermined number or less, the reading is performed by reading the words associated with the upper layer group.

3. The information process apparatus according to claim 1, wherein a plurality of the items are associated with the same word.

4. The information process apparatus according to claim 1, further comprising a crawling means which is configured to perform crawling in order to add a new word to the storage means.

5. The information process apparatus according to claim 1, wherein information of a user's preference is acquired, and
   wherein the grouping means performs the grouping of the users by performing the multivariate analysis using the information of the preference.

6. An information process method of an information process apparatus having an extraction means, a grouping means, a storage means, a determination means, and a reading means, comprising the steps of:
   in the extraction means, extracting words in a predetermined word class from comments which predetermined users write about a predetermined item;
   in the grouping means, grouping the predetermined users by performing a multivariate analysis using the words extracted by the extraction means, generating a matrix of the users and the words and performing a dimensional compression using the matrix, performing mapping of a result of the dimensional compression, and classifying the users into a plurality of groups by using a result of the mapping;
   in the storage means, storing the groups, the predetermined item, and the words in association with each other;
   in the determination means, determining which group a user who is to write a comment belongs to when the user is to write the comment about the predetermined item; and
   in the reading means, reading from the storage means words which are associated with the group determined by the determination means and the predetermined item which the comment is to be written about.

7. A nontransitory computer-readable storage medium encoded with a computer program, which when executed by a computer, causes the computer to execute processes on an information process apparatus having an extraction means, a grouping means, a storage means, a determination means, and a reading means, the processes comprising the steps of:
   in the extraction means, extracting words in a predetermined word class from comments which predetermined users write about a predetermined item;
   in the grouping means, grouping the predetermined users by performing a multivariate analysis using the words extracted by the extraction means, generating a matrix of the users and the words and performing a dimensional compression using the matrix, performing mapping of a result of the dimensional compression, and classifying the users into a plurality of groups by using a result of the mapping;
   in the storage means, storing the groups, the predetermined item, and the words in association with each other;
   in the determination means, determining which group a user who is to write a comment belongs to when the user is to write the comment about the predetermined item; and
   in the reading means, reading from the storage means words which are associated with the group determined by the determination means and the predetermined item which the comment is to be written about.

8. An information process apparatus comprising:
   an extraction unit which is configured to extract words in a predetermined word class from comments which predetermined users write about a predetermined item;
   a grouping unit which is configured to group the predetermined users by performing a multivariate analysis using the words extracted by the extraction unit, wherein the grouping unit generates a matrix of the users and the words and performs a dimensional compression using the matrix, performs mapping of a result of the dimensional compression, and classifies the users into a plurality of groups by using a result of the mapping;
   a storage unit which is configured to store the groups, the predetermined item, and the words in association with each other;
   a determination unit which is configured to determine which group a user who is to write a comment belongs to when the user is to write the comment about the predetermined item; and
   a reading unit which is configured to read from the storage unit words which are associated with the group determined by the determination unit and the predetermined item which the comment is to be written about.

* * * * *